United States Patent [19]

Mochizuki

[11] 4,205,199
[45] May 27, 1980

[54] TABLET INPUT DEVICE

[75] Inventor: Tamotsu Mochizuki, Yokosuka, Japan

[73] Assignee: Nippon Telegraph and Telephone Public Corporation, Tokyo, Japan

[21] Appl. No.: 909,282

[22] Filed: May 24, 1978

[30] Foreign Application Priority Data

| May 31, 1977 | [JP] | Japan | 52-63477 |
|---|---|---|---|
| May 31, 1977 | [JP] | Japan | 52-63478 |
| Jun. 2, 1977 | [JP] | Japan | 52-65040 |
| Jun. 7, 1977 | [JP] | Japan | 52-66935 |
| Jun. 7, 1977 | [JP] | Japan | 52-66936 |
| Jan. 31, 1978 | [JP] | Japan | 53-8816 |

[51] Int. Cl.² ............................................. G08C 21/00
[52] U.S. Cl. ............................................. 178/19; 178/18
[58] Field of Search ............... 178/18, 19; 325/62; 33/1 M, 1 J; 340/365 L

[56] References Cited

U.S. PATENT DOCUMENTS 3,598,903  8/1971  Johnson et al. ................... 178/18

FOREIGN PATENT DOCUMENTS 6465  5/1970  Japan ................... 340/365 L

Primary Examiner—Thomas A. Robinson
Attorney, Agent, or Firm—Burgess, Ryan and Wayne

[57] ABSTRACT

A tablet input device includes a manipulation pad with a group of parallel drive lines and a group of sense lines which are interlaced in parallel with the drive lines. A drive circuit is provided which sequentially scans the drive lines with a variable drive current. When an input pen indicates a point on the face of the manipulation pad and when one of the drive lines adjacent to this point is excited, a voltage is induced across one or more sense lines adjacent the excited drive line. A sense circuit is provided which detects the magnitude or the polarity of the induced voltage, thereby detecting the address of the point indicated by the input pen.

16 Claims, 23 Drawing Figures

FIG. 18

TABLET INPUT DEVICE

BACKGROUND OF THE INVENTION

The present invention relates to a computer-system tablet input device which reads the address data of patterns or characters.

In a prior art tablet input device, connected to a drive circuit are a plurality of drive loops or a plurality of geometric parallel drive lines two of which may form a drive loop, and a plurality of sense loops or a plurality of parallel sense lines two of which may form a sense loop arrayed perpendicular to the drive loops or lines and connected to a sense circuit. The drive and sense circuits in turn are connected to a decode circuit which converts into the scanning pulses the address data (that is, the numbers of the drive and sense lines) of the drive and sense lines. In response to the scanning pulses from the decode circuit, the drive circuit sequentially selects the drive loops and passes a drive current through the selected drive loop. In like manner, in response to the scanning pulses from the decode circuit the sense circuit sequentially selects the sense loops.

When one touches with an input pen having a magnetic tip a rectangular region or address defined by one of the drive or sense loops, the electromagnetic coupling between the drive and sense loops associated with the selected region or address is increased so that when the associated drive loop is selected and excited, a voltage which exceeds a predetermined threshold level is induced across the associated sense loop. The sense circuit detects this induced voltage and transmits a detect signal to the decode circuit so that the decode circuit may output the numbers of the associated drive and sense loops in a coded form.

With the prior art input device with the number of m drive loops and the number of n sense lines, one scanning of the face of the manipulation pad requires the selection and excitation of the drive loops m times and the number of (m×n) times of selection and detection of the sense loops. In case of reading complex patterns and characters such as kanji, the input items are increased and a high resolution is required. Therefore the drive and sense loops must be increased in number so that the scanning time is inevitably increased, resulting in unsatisfactory operability or manipulability.

SUMMARY OF THE INVENTION

Accordingly, one of the objects of the present invention is to provide a tablet input device wherein drive and sense lines are arrayed in parallel so that the position of the input pen in the direction of rows (that is, the X coordinate) and the position of the input pen in the direction of columns (that is, the Y coordinate) may be detected independently of each other, whereby the scanning time may be reduced and operability may be much enhanced.

To the above and other ends, the present invention provides a tablet input device comprising a manipulation pad with a group of parallel drive lines and a group of sense lines which are interlaced in parallel with the drive lines, a drive circuit connected to the drive lines for sequentially selecting one or more drive lines and passing a variable drive current through the one or more selected drive lines, a sense circuit connected to the sense lines for sequentially selecting one or more sense lines associated with the one or more selected drive lines and detecting the magnitude or polarity of the voltage induced across the one or more selected sense lines, and an input pen with a magnetic body or an electrically conductive body for indicating a desired point on the face of the manipulation pad, whereby when one or more drive lines in the vicinity of the input pen on the face of the manipulation pad are selected and excited, the sense circuit may detect the magnitude or polarity of the voltage induced across one or more sense lines associated with the one or more selected and excited drive lines, thereby detecting the position of the tip of the input pen.

BRIEF DESCRIPTION OF THE DRAWINGS:

FIG. 18 is a block diagram of a ninth embodiment of the present invention;

Same reference numerals are used to designate similar parts throughout the figures.

DESCRIPTION OF THE PREFERRED EMBODIMENTS

Figure 1:
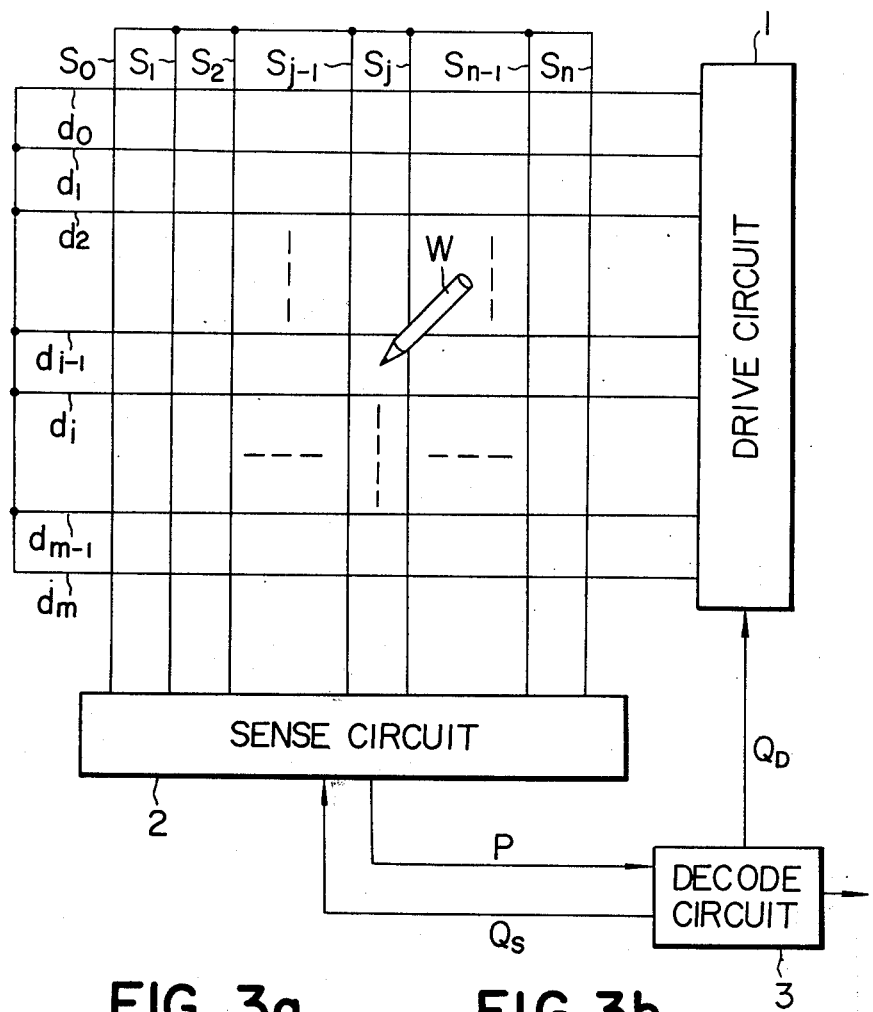
FIG. 1 is a schematic diagram of a prior art tablet input device.

Prior Art, FIG. 1

Prior to the description of the preferred embodiments of the present invention, a prior art manipulation pad will be described briefly in order to more distinctly and specifically point out its drawbacks. As shown in FIG. 1, the prior art tablet manipulation pad comprises a plurality of drive lines $d_0, d_1, \ldots,$ and $d_m$, a plurality of sense lines $s_0, s_1, \ldots,$ and $s_n$ which are perpendicular to the drive lines, a drive circuit 1 for selecting a pair of successive drive lines sequentially and passing the drive current through them, a sense circuit 2 for selecting sequentially a pair of successive sense lines and sensing the voltages induced across these selected sense lines, a decode circuit 3 for decoding the address data or the numbers of the selected drive and sense lines, thereby obtaining the scanning pulses $Q_D$ and $Q_S$ in response to which the drive and sense circuits 1 and 2 select the next pair of drive and sense lines, and an input pen W having a magnetic body.

In operation, in response to the scanning pulses $Q_D$ from the decode circuit 3, the drive circuit 1 sequentially selects the drive lines in such a way that in the first scanning step the drive lines $d_0$ and $d_1$ are selected, in the second scanning step the drive lines $d_1$ and $d_2$ are selected and in the m-th step the drive lines $d_{m-1}$ and $d_m$ are selected and so on. The drive circuit 1 pass the drive current through the selected drive lines as described above. In like manner, the sense circuit 2 responds to the scanning pulses $Q_S$ from the decode circuit 3 so that pairs of sense lines $s_0$ and $s_1$, $s_1$ and $s_2$, ..., and $s_{n-1}$ and $s_n$ are sequentially selected. The sense circuit 2 senses whether or not the voltages induced across the selected sense lines are in excess of a predetermined threshold voltage.

Assume that the input pen is in touch with a square elementary area defined by the drive lines $d_{i-1}$ and $d_i$ and the sense lines $s_{j-1}$ and $s_j$. Then the electromagnetic coupling between these drive and sense lines is enhanced. When these drive and sense lines ($d_{i-1}$ and $d_i$) and ($s_{j-1}$ and $s_j$) are selected and these drive lines are energized, the induced voltages across the sense lines $s_{j-1}$ and $s_j$ are in excess of a predetermined threshold level so that the sense circuit 2 transmits an output or detect signal P to the decode circuit 3 which in turn outputs the address data of the input pen W; that is, the number i of the selected drive line d and the number j of the selected sense wire s.

With the manipulation pad having the number $(m+1)$ of drive lines d and the number of $(n+1)$ of sense lines s, one scanning of the pad face requires the number m of selections of the drive lines d and the number $(m \times n)$ of selections of the sense lines n. As a result, when the manipulation pad is used for inputting complex letters such as kanji or complex patterns, the number of drive and sense lines must be considerably increased so that the number of input items may be increased and a high resolution may be attained. As a consequence, the scanning time is inevitably increased with resulting unsatisfactory manipulability or operability.

Figure 2:
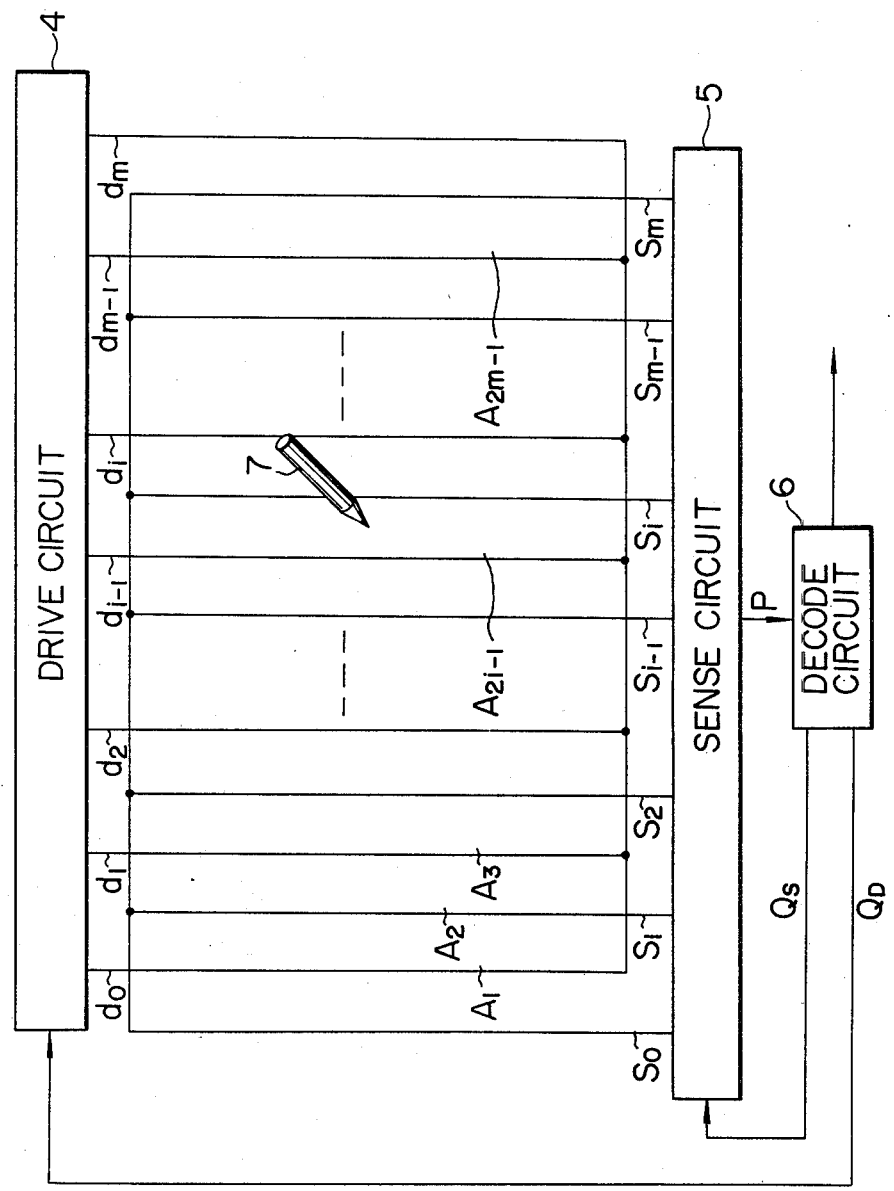
FIG. 2 is a schematic diagram of a first embodiment of a tablet input device in accordance with the present invention.

First Embodiment, FIG. 2

Referring to FIG. 2, the first embodiment of the present invention will be described. One end of each of the drive lines $d_0, d_1, \ldots, d_m$ is connected to the drive circuit 4 while the other ends thereof are connected together. The sense lines $s_0, s_1, \ldots, s_m$ each are extended between the adjacent drive lines d and in geometric parallel therewith, and one end of each of the sense lines s is connected to the sense circuit 5 while the other ends thereof are connected together. The decode circuit 6 transmits the scanning pulses $Q_S$ and $Q_D$ to the sense and drive circuits 5 and 4, respectively, so that they may sequentially select the sense and drive lines in a manner substantially similar to that described above.

Figures 3A, 3B:
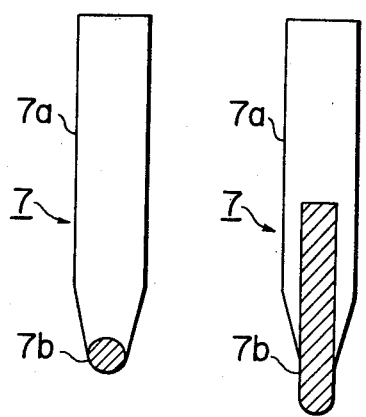
FIGS. 3(a) and 3(b) show schematic views of an input pen used in the present invention.

Referring to FIG. 3, the input pen 7 comprises a holder 7a and a magnetic body 7b. The holder 7a is made of a material such as a hard plastic which is free from the effects of the magnetic flux and is in the form of a pen holder in the first embodiment. The holder 7a is in any form as far as it may be easily gripped and operated. The magnetic body 7b consists of a material having a high permeability such as a ferrite. It may be in the form of a ball as shown in FIG. 3(a) or in the form of a cylinder with a rounded end as shown in FIG. 3(b). The ball-shaped magnetic body 7b (See FIG. 3(a)) has a relatively low sensitivity, but an error due to the inclination of the input pen 7 with respect to the manipulation pad in detecting the position of the input pen 7 may become less. On the other hand, the cylindrical magnetic body 7b (See FIG. 3(b)) has a high sensitivity, but an error due to the inclination of the input pen 7 with respect to the manipulation pad is slightly greater than an error of the input pen 7 with the ball-shaped magnetic body 7b. However, since the closer to the manipulation pad, the stronger the magnetic flux distribution becomes and because the magnitudes of the voltages induced across the sense lines s are almost independent of the shape of the tip of the input pen, the difference in detection error between the input pen shown in FIG. 3(a) and the input pen shown in FIG. 8(b) is almost negligible. Furthermore instead of the magnetic body 7b, an electrically conductive body made of copper or the like may be used, but the sensitivity drops by about 50% and the polarities of the voltage induced across the sense line s are opposite to those of the voltage detected with the input pen with the magnetic body 7b.

Next the mode of operation of the first embodiment with the above construction will be described. In response to the scanning pulses $Q_D$ from the decode circuit 6, the drive circuit 4 selects the drive lines $d_0$ and $d_1$ and passes through them the variable drive current while in response to the scanning pulses $Q_S$ from the decode circuit 6 the sense circuit 5 selects the sense lines $s_0$ and $s_1$. Whether or not the input pen 7 is present at the region $A_1$ bounded by these selected drive and sense lines ($d_0$ and $d_1$) and ($s_0$ and $s_1$) is detected by determining whether or not the voltage induced across the terminals of the sense lines $s_0$ and $s_1$ is in excess of a predetermined level.

Next while the drive lines $d_0$ and $d_1$ remain selected and excited, the sense circuit 5 responds to the next scanning pulse $Q_S$ to select the sense lines $s_1$ and $s_2$ and whether or not the input pen 7 is present in the region $A_2$ bounded by the drive lines $d_0$ to $d_1$ and the newly selected sense lines $s_1$ and $s_2$ is detected in the manner described above. Thereafter while the sense lines $s_1$ and $s_2$ remain selected, the drive circuit 4 responds to the next scanning pulse $Q_D$ to select the drive lines $d_1$ and $d_2$ and excite them. Whether or not the input pen 7 is present at the region $A_3$ bounded by the newly selected drive lines $d_1$ and $d_2$ and the sense lines $s_1$ and $s_2$ is detected in the manner described above. In like manner, the drive and sense lines d and s are alternately selected and whether or not the input pen 7 is present in the region A bounded by the selected drive and sense lines is detected. Finally, the drive lines $d_{m-1}$ and $d_m$ and the sense lines $s_{m-1}$ and $s_m$ are selected and whether or not the input pen 7 is present in the region $A_{2m-1}$ bounded by these selected drive and sense lines is detected. Thus, one scanning operation is completed.

More particularly, when a user puts the input pen 7 in the region $A_{2i-1}$ bounded by the drive lines $d_{i-1}$ and $d_i$ and the sense lines $s_{i-1}$ and $s_i$ and when these drive and sense lines are selected the voltage induced between the terminals of the sense lines $s_{i-1}$ and $s_i$ exceeds a predetermined threshold level so that the sense circuit 5 detects or senses the presence of the input pen 7 in the region $A_{2i-1}$ and transmits the detection pulse P to the decode circuit 6. The decode circuit 6 is counting the number of scanning pulses $Q_D$ and $Q_S$ transmitted to the drive and sense circuits 4 and 5, respectively, and in response to the detection pulse P from the sense circuit 5 the decode circuit 6 outputs the output or the address data of the input pen 7 which is equal to the sum of the numbers of scanning pulses $Q_D$ and $Q_S$ transmitted minus one; that is, $2_{i-1}$.

In summary, in the first embodiment the pad face is divided into $(2_{m-1})$ input pen addresses by the number of m interleaved drive and sense lines d and s, and the presence or absence of the input pen 7 at any addresses may be detected in the manner described above.

Figure 4:
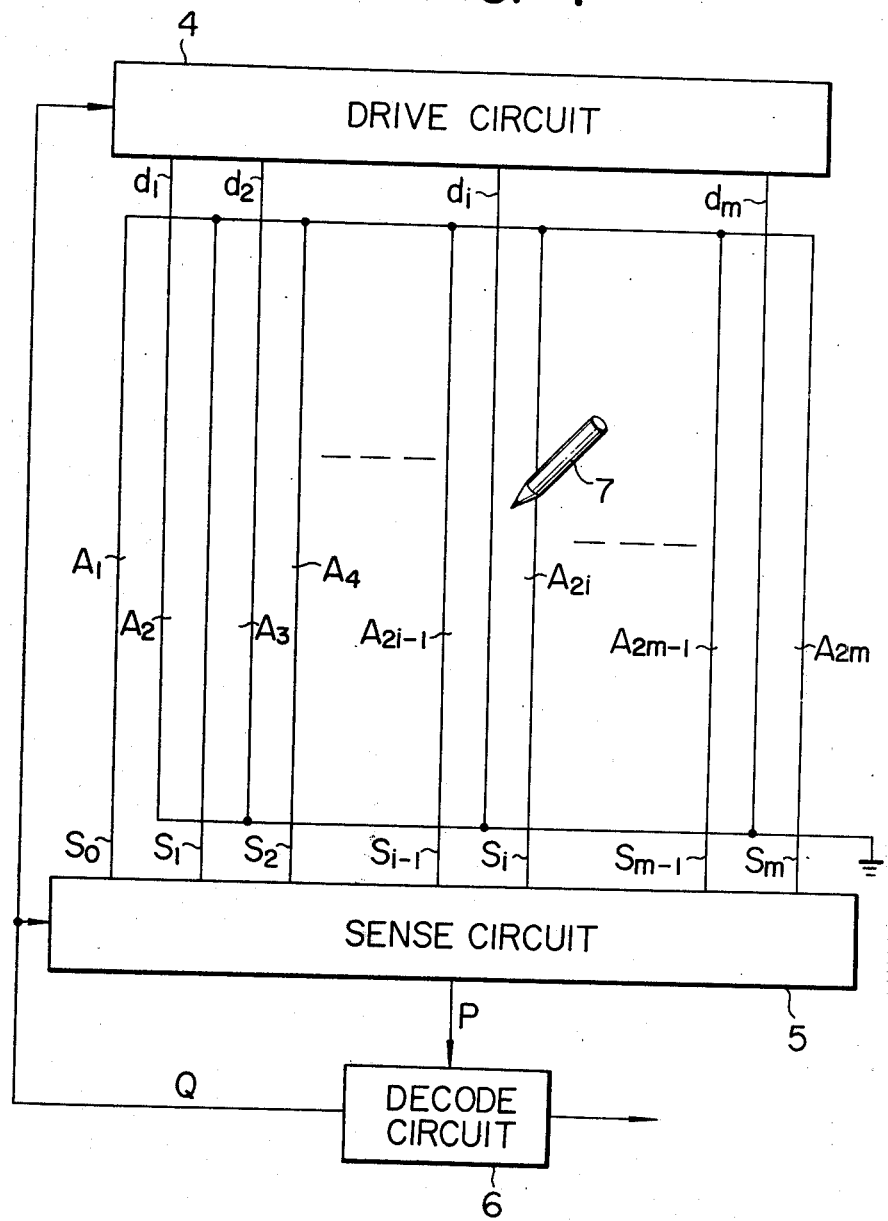
FIG. 4 is a schematic diagram of a second embodiment of the present invention.

Second Embodiment, FIG. 4

In the second embodiment shown in FIG. 4, the drive and sense lines d and s are arrayed in row or column in a manner substantially similar to that of the first embodiment, but the common scanning pulses Q are transmitted from the decode circuit 6 to the drive and sense circuits 4 and 5 and the other ends of the drive lines $d_1$ through $d_m$ are grounded in common. In this specification, the term "the other ends of the drive lines are grounded in common" or "grounding the other ends of the drive lines in common" refers to "feeding back the current to the drive circuit 4 without causing any effects on the electromagnetic induction of the pad face".

Figure 5:
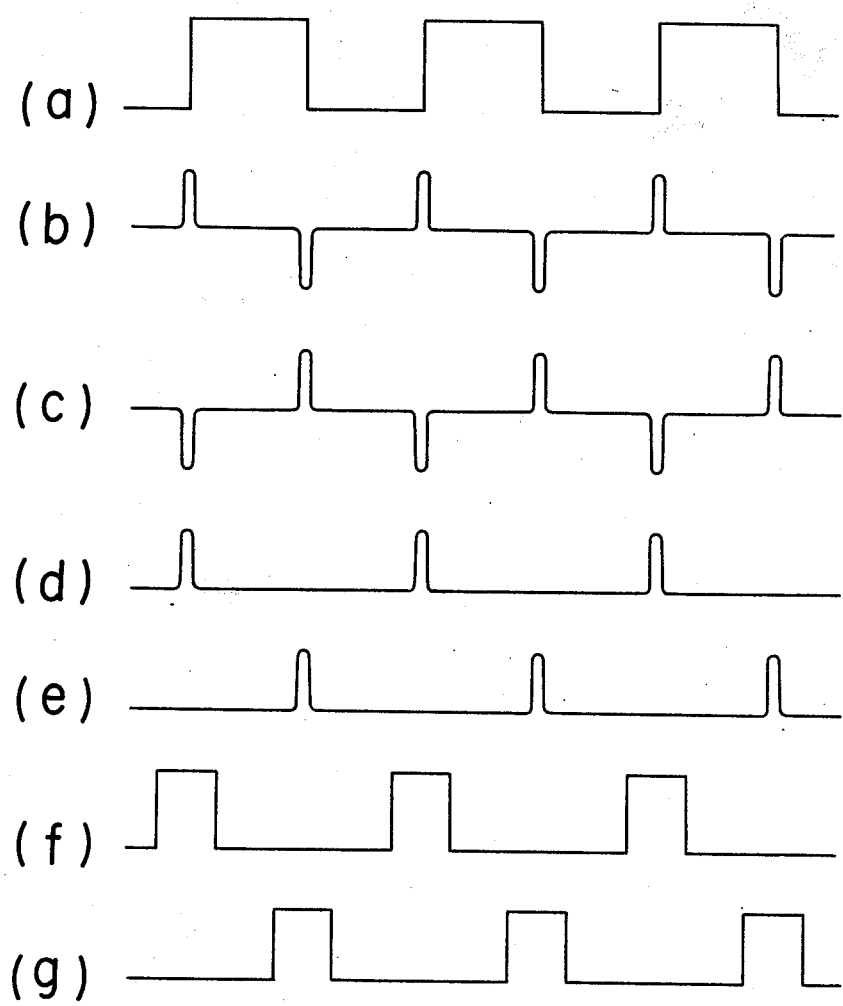
FIGS. 5(a)–(g) shows waveforms used for the explanation of the mode of operation of the second embodiment.

Next the mode of operation will be described. First in response to the scanning pulse Q from the decode circuit 6 the drive circuit 4 selects the drive line $d_1$ and pass through it the variable or pulsating drive current as shown in FIG. 5(a), and then the sense circuit 5 selects the pair of sense lines $s_0$ and $s_1$ and detects not only whether or not the voltage induced across the terminals of the sense lines $s_0$ and $s_1$ exceeds a predetermined threshold value but also the phase of the detected voltage, thereby detecting whether the input pen 7 is present in the region or address $A_1$ bounded by the drive line $d_1$ and the sense line $s_0$ or in the region or address $A_2$ bounded by the line $d_1$ and the sense line $s_1$ as will be described in detail hereinafter. Next the drive circuit 4 selects the drive line $d_2$ and excites it while the sense circuit 5 selects the sense lines $s_1$ and $s_2$ and detects whether the input pen 7 is present in the region $A_3$ bounded by the drive line $d_2$ and the sense line $s_1$ or in the region or address $A_4$ bounded by the drive line $d_2$ and the sense line $s_2$. In like manner, the scanning step is cycled until the drive circuit 4 selects the drive line $d_m$ while the sense circuit 5 selects the sense lines $s_{m-1}$ and $s_m$ and detects whether the input pen 7 is present in the region or address $A_{2m-1}$ or $A_{2m}$.

More particularly, when the user puts the input pen 7 in the region or address $A_{2i-1}$ or $A_{2i}$ and when the drive line $d_i$ and the sense lines $s_{i-1}$ and $s_i$ which define these regions or addresses $A_{2i-1}$ or $A_{2i}$ are selected, the voltage induced across the terminals of the sense lines $s_{2i-1}$ and $s_i$ exceeds a predetermined level. The vertical components of the magnetic fluxes induced by the driving current flowing through the drive line $d_i$ are opposite in direction in the regions or addresses $A_{2i-1}$ and $A_i$, and the direction of the voltage induced across the sense line $s_{i-1}$ or $s_i$ is dependent upon the direction of the vertical component of the magnetic flux in the region or address $A_{2i-1}$ or $A_{2i}$. Therefore depending upon whether the input pen 7 has selected the region or address $A_{2i-1}$ or $A_{2i}$, the sense circuit 5 detects or senses the induced pulses as shown in FIG. 5(b) or 5(c). It can be seen that the detected pulses shown in FIGS. 5(b) and 5(c) are out of phase by 180° from each other.

In order to discriminate these detected pulses, the negative going pulses are clipped as shown in FIG. 5(d) and FIG. 5(e), and the logical products of the positive pulses shown in FIGS. 5(d) and 5(e) with the sampling pulses as shown in FIGS. 5(f) and 5(g) are obtained. The logical product of the positive pulses shown in FIG. 5(d) and the sampling pulses shown in FIG. 5(f) is "1", but the logical product of the positive pulses shown in FIG. 5(d) and the sampling pulse shown in FIG. 5(g) is "0". In like manner, the logical product of the positive pulses shown in FIG. 5(e) and the sampling pulses shown in FIG. 5(g) is "1", but the logical product of the positive pulses shown in FIG. 5(e) and the sampling pulses shown in FIG. 5(f) is "0". Thus whether the input pen 7 is in the region or address $A_{2i-1}$ or $A_{2i}$ may be detected.

The sense circuit 5 therefore transmits to the decode circuit 6 the detection pulses P which represent not only that the input pen 7 is present in the region bounded by the drive line $d_i$ and the sense lines $s_{i-1}$ and $s_i$ but also the identification code whether the input pen 7 is present in the region $A_{2i-1}$ or $A_{2i}$. In response to the detection pulses, the decode circuit 6 outputs the address data of the input pen 7; that is, $(2_{i-1})$ or $(2_i)$.

In summary, according to the second embodiment the address data of the input pen 7 may be obtained by selecting and exciting only one drive line d while simultaneously selecting two sense lines a sandwiching this selected drive line d.

Figure 6:
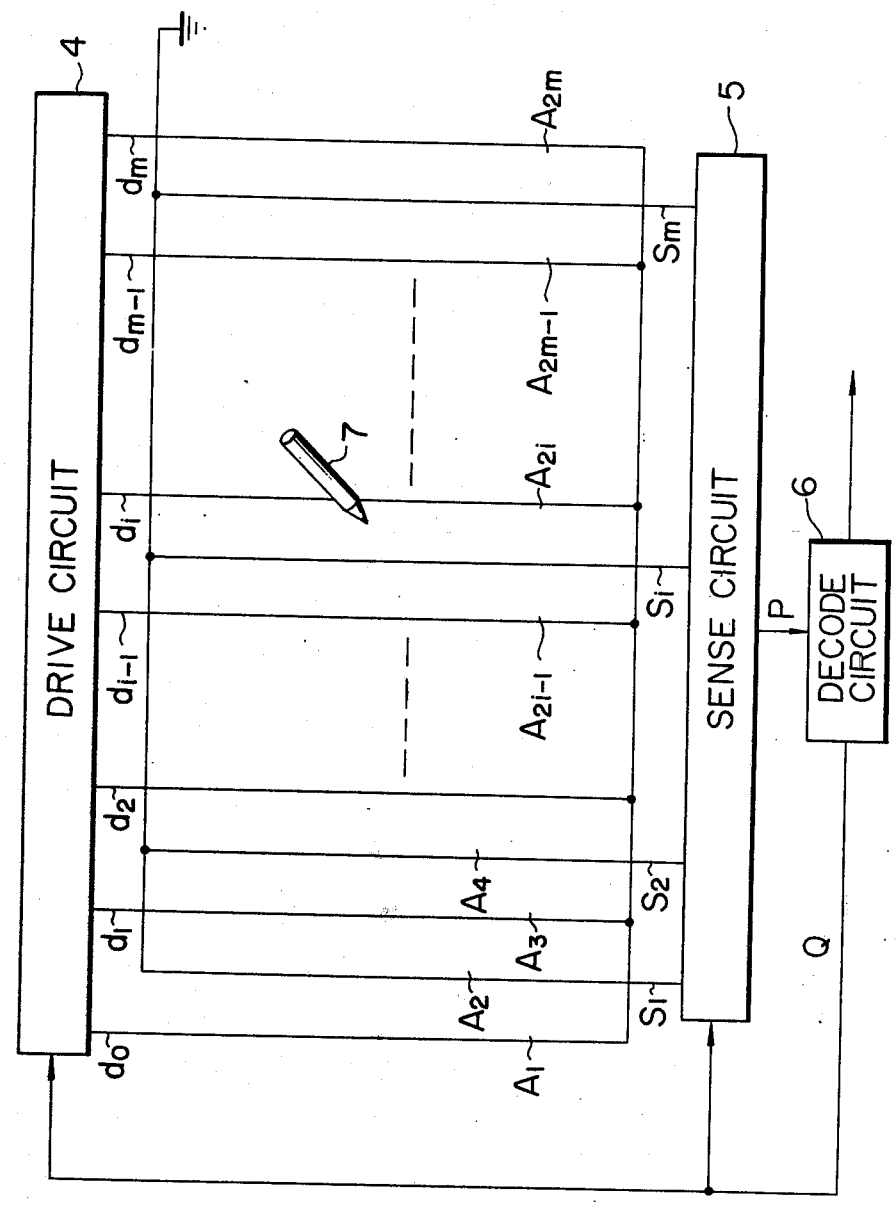
FIG. 6 is a schematic diagram of a third embodiment of the present invention.

Third Embodiment, FIG. 6

The third embodiment shown in FIG. 6 is substantially similar in construction to the second embodiment shown in FIG. 4 except that the other ends of the sense lines $s_1$ through $s_n$ are grounded in common while the other ends of the drive lines $d_1$ through $d_m$ are connected together.

The mode of operation of the third embodiment is also substantially similar to that of the second embodiment except that two drive lines are so selected as to sandwich one sense line s therebetween. In other words the third embodiment is electrically and magnetically equivalent to the second embodiment in that the sense lines function as the drive lines of the third embodiment while the drive lines function as the sense lines. Therefore the electromagnetic coupling between the drive and sense lines remains unchanged.

Figure 7:
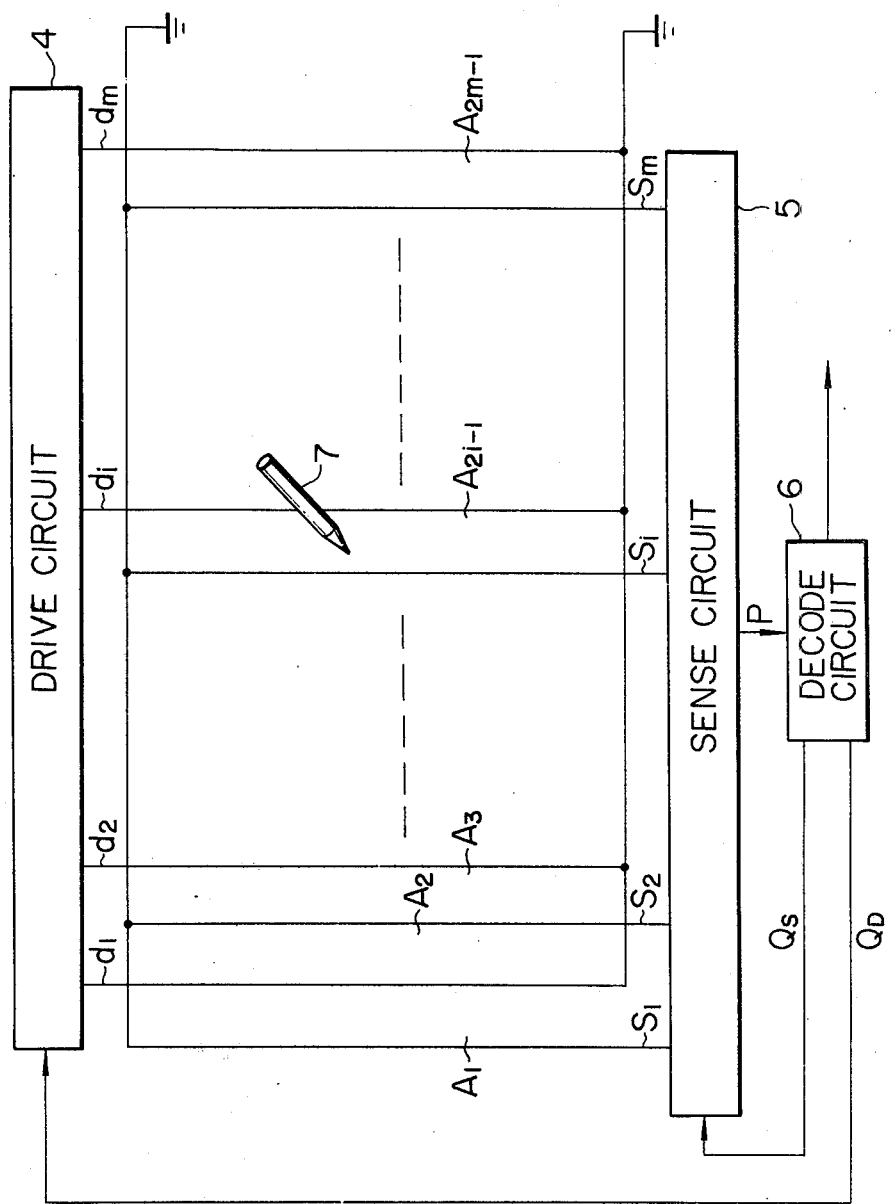
FIG. 7 is a schematic view of a fourth embodiment of the present invention.

Fourth Embodiment, FIG. 7

The fourth embodiment shown in FIG. 7 is substantially similar in construction to the first embodiment shown in FIG. 2 except that the other ends of both the drive and sense lines d and s are grounded in common. However, in operation only one drive line d is selected and excited and one sense line s which is adjacent to the selected drive line d on either side is selected, as will be described in detail below.

In response to the scanning pulse $Q_D$ from the decode circuit 6, the drive circuit 4 selects and excites the drive line $d_1$ while in response to the scanning pulse $Q_S$ the sense circuit 5 selects the sense line $s_1$ and detects whether the voltage induced across the selected sense line $s_1$ is in excess of a predetermined level or not, thereby sensing whether or not the input pen 7 is present at the region or address $A_1$ bounded by the drive line $d_1$ and the sense line $s_1$. Next while the drive line $d_1$ remains selected and excited, the sense circuit 5 selects the sense line $s_2$ in response to the next scanning pulse $Q_S$ and detects whether or not the input pen 4 is present in the region $A_2$ defined between the drive line $d_1$ and the sense line $s_2$. Thereafter while the sense line $s_2$ remains selected, the drive circuit 4 selects and excites the drive line $d_2$. The sense circuit 5 detects whether or not the input pen 7 is present in the region or address $A_3$ bounded by the drive line $d_2$ and the sense line $s_2$. In like manner the scanning step is cycled until the sense circuit 5 detects whether or not the input pen 7 is present in the region or address $A_{(2m-1)}$.

More particularly when the user puts the input pen 7 at the region $A_{(2i-1)}$ and when the drive line $d_i$ and the sense line $s_i$ are selected, the voltage induced across the selected line $s_i$ exceeds the predetermined threshold value so that the sense circuit 6 transmits the detection signal or pulse P to the decode circuit 6. In response to the detection signal or pulse P, the decode circuit 6 outputs the address data $(2i-1)$ of the input pen 4 based on the counting of the scanning pulses $Q_D$ and $Q_S$ transmitted to the drive and sense circuits 4 and 5, respectively.

In summary according to the fourth embodiment of the present invention the address code of the input pen 7 at any of $A_{2m-1}$ regions or addresses in row or column defined by the number m of drive lines d and the number m of sense lines s may be obtained by selecting and exciting only one drive line d and selecting one sense line s adjacent on either side of the selected and excited drive line d.

Figure 8:
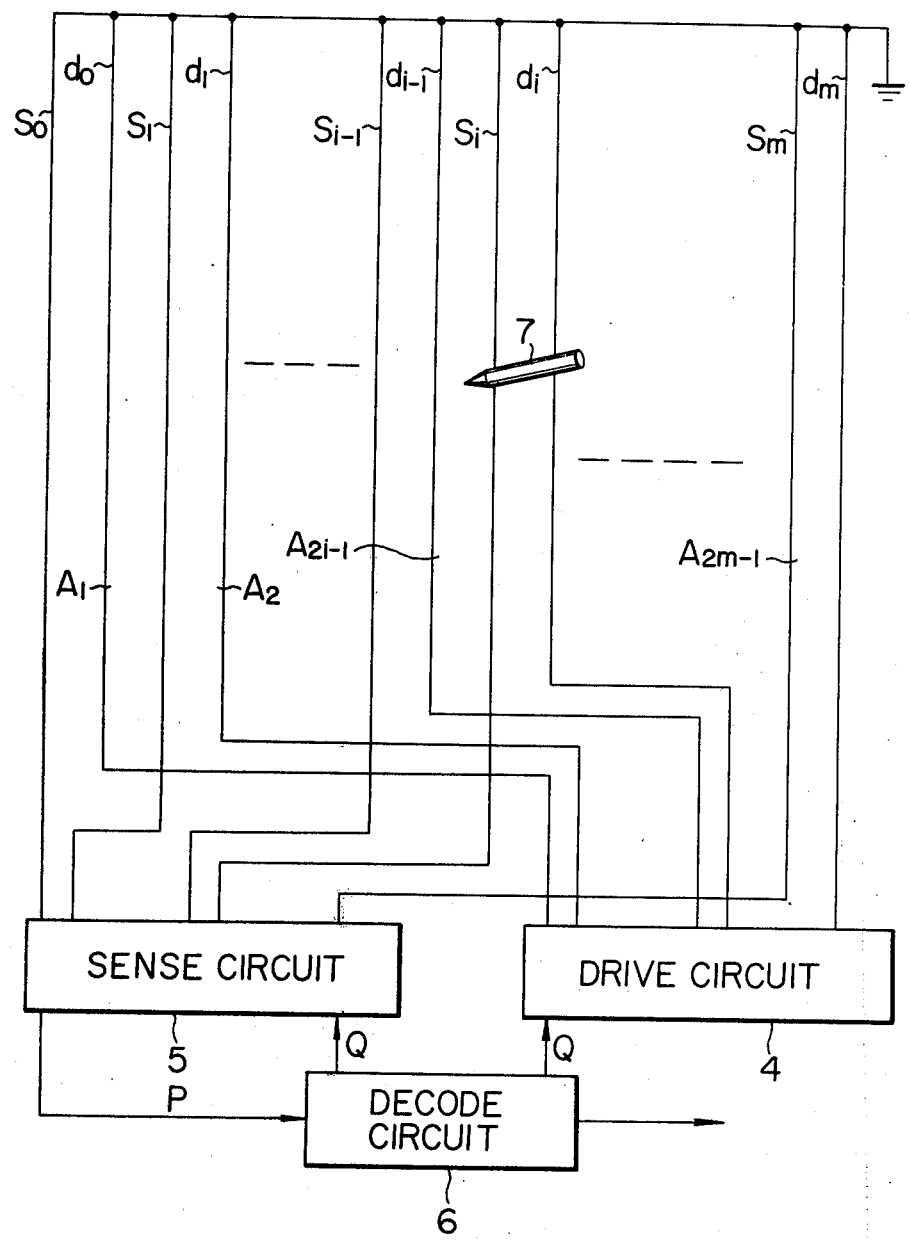
FIG. 8 is a schematic view of a fifth embodiment of the present invention.

Fifth Embodiment, FIG. 8

Figure 9:
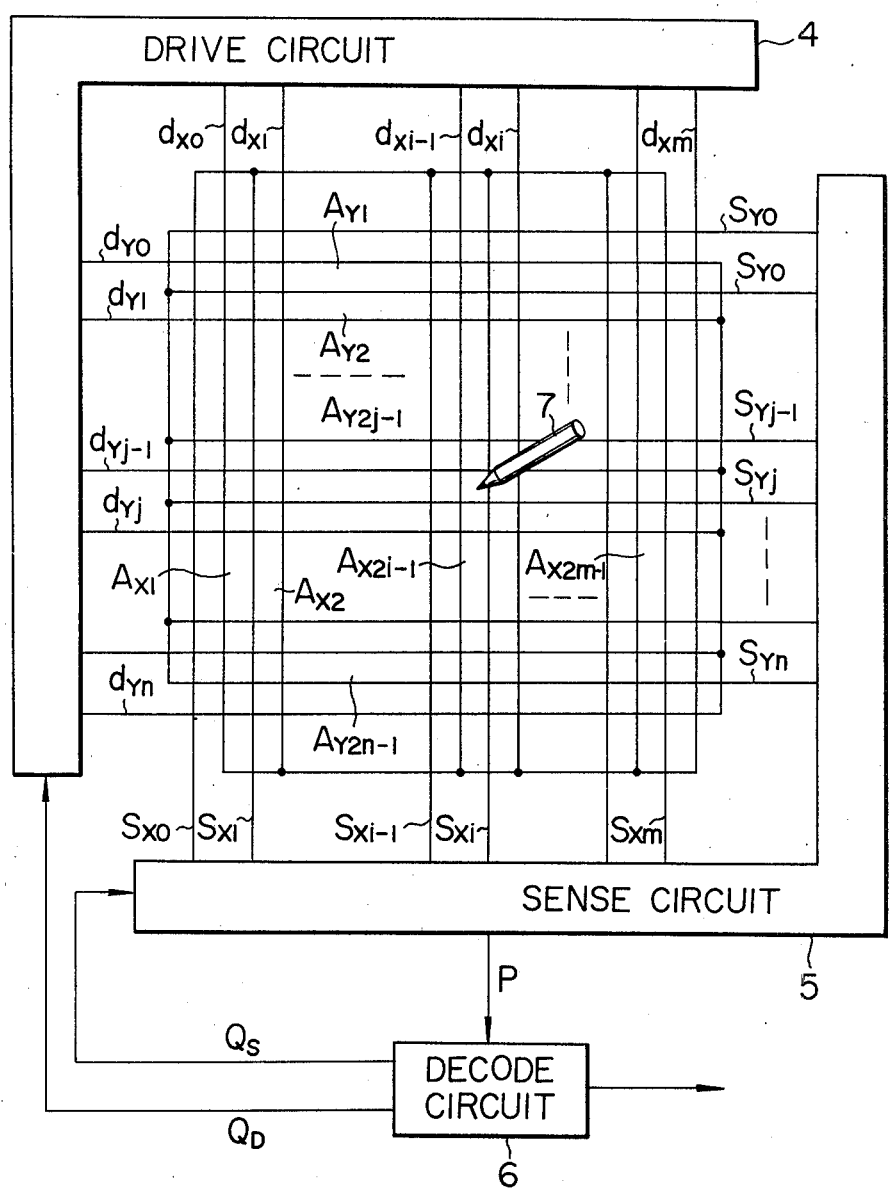
FIG. 9 is a schematic diagram of a sixth embodiment which is based upon the second embodiment and which may detect the point indicated by the input pen in terms of X and Y coordinates.

The fifth embodiment shown in FIG. 9 is substantially similar in construction to the fourth embodiment described above with reference to FIG. 7 except that the other ends of both the drive and sense lines $d_0$ through $d_m$ and $s_0$ through $s_m$ are grounded in common. The mode of operation of the fifth embodiment is also substantially similar to that of the fourth embodiment.

So far the present invention has been described in detail as obtaining the address data of the input pen 7 with respect to the X- or Y-axis on the manipulation pad face, but the present invention may detect the coordinates (X, Y) of the input pen in a Cartesian coordinate system constructed on the manipulation pad face as will be described in detail below.

Sixth Embodiment, FIG. 9

The sixth embodiment shown in FIG. 9 is an improvement of the first embodiment shown in FIG. 2. The drive lines $d_{X0}, d_{x1}, \ldots, d_{Xm}$ and the sense lines $s_{X0}, s_{X1}, \ldots, s_{Xn}$ are arrayed in a manner substantially similar that of the first embodiment in order to detect the X coordinate of the input pen 7 while the drive lines $d_{Y0}, d_{Y1}, \ldots, d_{Yn}$ and the sense lines $s_{Y0}, s_{Y1}, \ldots, s_{Yn}$ are arrayed in order to detect the Y coordinate of the input pen 7. The Y-axis drive lines $d_Y$ are perpendicular to the X-axis drive line $d_X$ while the Y-axis sense lines $s_Y$ are perpendicular to the X-axis sense lines $s_X$.

Assume that the input pen 7 is present at the square region or elementary area common to the X-axis region $A_{X2i-1}$ bounded by the drive line $d_{Xi-1}$ and the sense line $s_{Xi}$ and the Y-axis region $A_{Y2j-1}$ bounded by the drive line $d_{Yj-1}$ and the sense line $s_{Yj}$. Then when the X-axis drive lines $d_{Xi-1}$ and $d_{xi}$ are selected and excited while the X-axis sense lines $s_{Xi-1}$ and $s_{Xi}$ are simultaneously selected, the sense circuit 5 detects that the voltage induced across the terminals of the sense lines $s_{Xi-1}$ and $s_{Xi}$ is in excess of the predetermined level and transmits the detection signal or pulse P to the decode circuit 6 in the manner described above. In response to the detection pulse P the decode circuit 6 stores the X-axis address data or the X coordinate $(2i-1)$ in a registor. In like manner, when the Y-axis drive lines $d_{Yj-1}$ and $d_{Yj}$ are selected and excited while the Y-axis sense lines $s_{Yj-1}$ and $s_{Yj}$ are simultaneously selected, the sense circuit 5 transmits the detection pulse P to the decode circuit 6 which in turn outputs the Y-axis address or the Y-coordinate $(2j-1)$ together with the X-axis address $(2i-1)$ which has been stored.

In summary, according to the sixth embodiment the address data or the position or coordinate of the input pen 7 on the pad face may be obtained by the number of $(m+n)$ times selection of the drive and sense lines.

Figure 10:
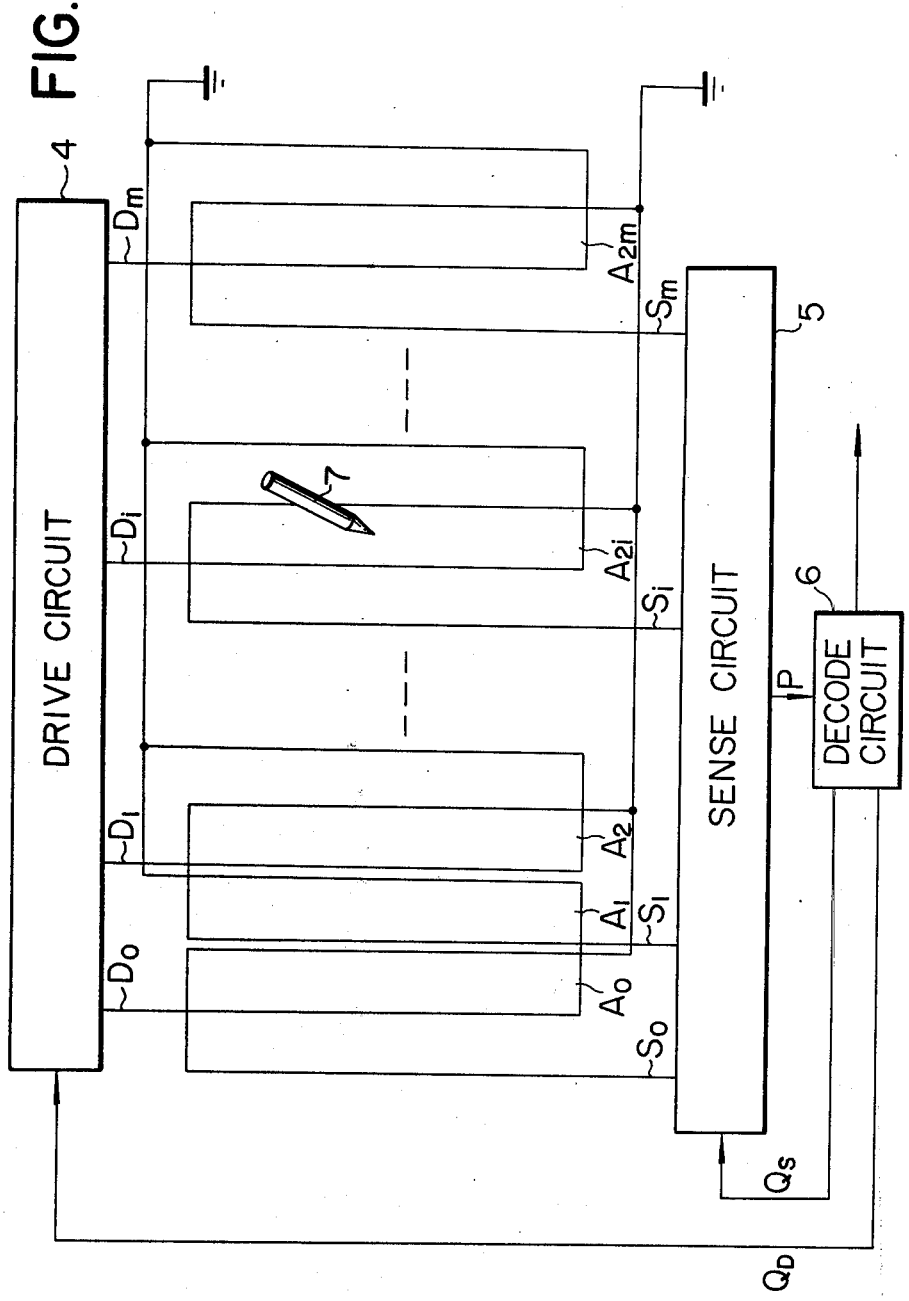
FIG. 10 is a schematic diagram of a seventh embodiment of the present invention.

Seventh Embodiment, FIG. 10

In the first through fifth embodiments of the present invention the drive and sense lines $d_o$ through $d_m$ and $s_o$ through $s_m$ have been described as being arrayed in geometric parallel with each other, but in the seventh embodiment these drive lines $D_o$ through $D_m$ and the sense lines $S_o$ through $S_m$ are each arrayed in the form of a loop, and the other ends of the drive and sense lines D and S are grounded in common.

The mode of operation of the seventh embodiment is substantially similar to that of the first embodiment described with reference to FIG. 2. That is, instead of selecting and driving a pair of drive lines $d_i$ and $d_{i+1}$ which form a loop, in the seventh embodiment one drive line $D_i$ which forms a loop is selected and excited. In like manner, instead of selecting a pair of sense lines $s_i$ and $s_{i+1}$ in the first embodiment, one looped sense line $S_i$ is selected.

In summary, according to the seventh embodiment the address data of the input pen in any of the $(2m+1)$ regions or addresses in row or column may be detected by the number of $(m+1)$ times selection and excitation of the drive lines D and the number of $(m+1)$ times selection of the looped sense lines S.

Figure 11:
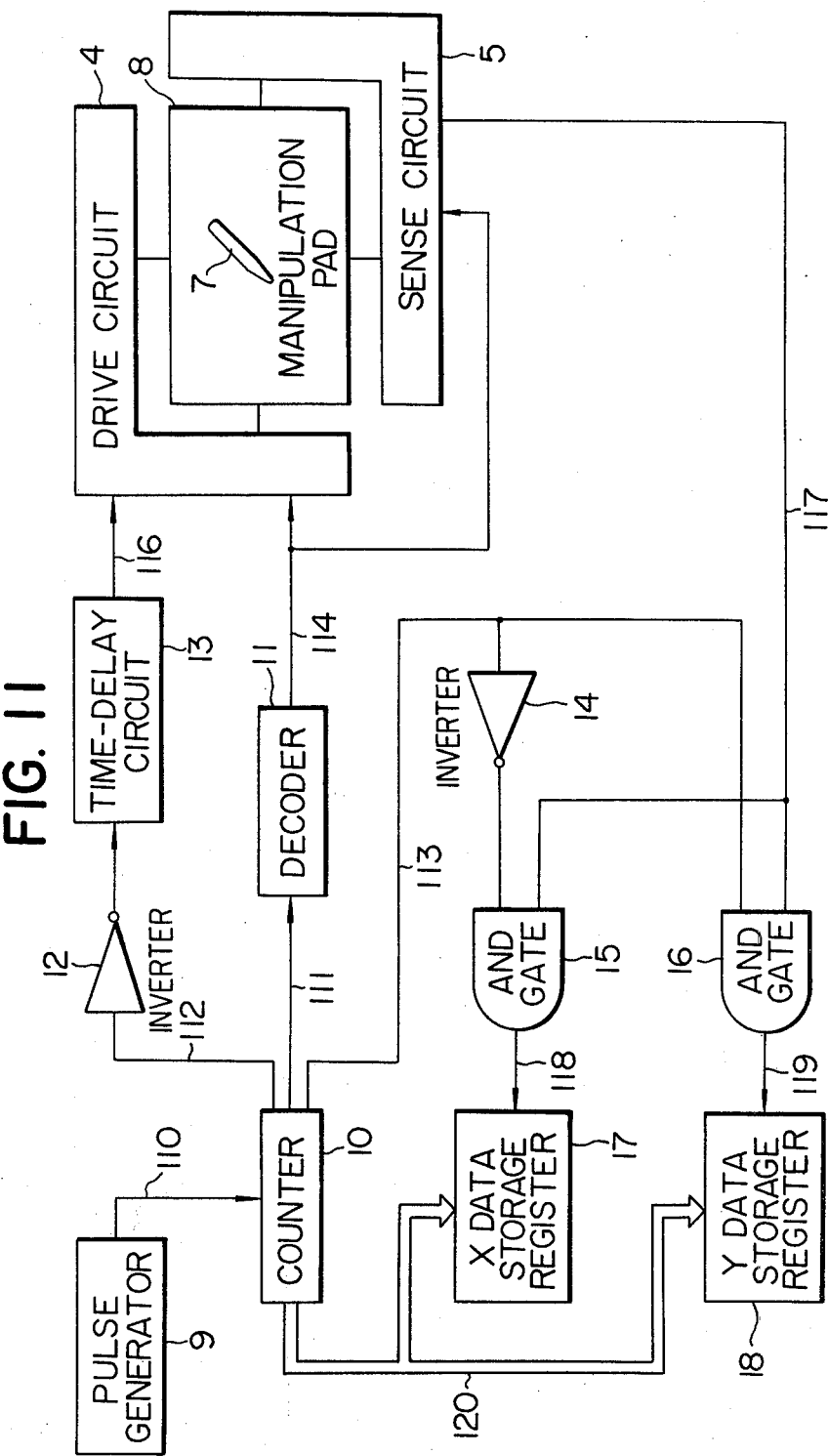
FIG. 11 is a block diagram of an eighth embodiment of the present invention.

Eighth Embodiment, FIG. 11

The 8-th embodiment shown in FIG. 11 comprises the drive circit 4, the sense circuit 5, the input pen 7, a manipulation pad 8 upon which are arrayed the drive and sense lines according to any of the preceding embodiments described above, a pulse generator 9, a counter 10, a decoder 11, an inverter 12, a time-delay circuit 13, an inverter 14, AND gates 15 and 16, an X data storage register 17, and a Y data storage register 18.

The pulse generator 9 transmits the clock pulses 110 to the counter 10 which has five bits and in turn outputs the 4-bit address selection code 111 (consisting of the bits in the second, third, fourth and fifth digits in the counter 10) to the decoder 11, one-bit signal 112 (the first bit in the counter 10) to the inverter 12 and one-bit signal 113 (the fifth bit in the counter 10) to the inverter 14 and the AND gate 16. The decoder 11 transmits a 16-line address selection signal 114 to the drive circuit 4. The delay circuit 13 applies a drive current control signal 116 to the drive circuit 4. The AND gate 15 transmits a detect strobe signal 118 to the X data register 17 while AND gate 16 transmits a detect strobe signal 119 to the Y data register 18. A 4-bit detected data is represented by 120.

The manipulation pad 8 includes a working board or the like upon which a drawing may be placed and a printed circuit board which is disposed below the working board and upon which are arrayed the drive and sense lines in any of the manners described above.

Next the mode of operation of the 8-th embodiment with the above construction will be described. It is to be understood that the term "a high or low level" of any signal refers to a high or low level of TTL.

First in response to the 16-line X-direction and Y-direction address selection signals 114, the drive circuit 4 the X- and Y-axis drive lines sequentially through a bank of diode switches and excites the selected drive line with the rectangular waveform driving current which is controlled by the drive current control signal 116 from the delay circuit 13. Simultaneously in response to the address selection signal 114, the sense circuit 5 selects two X- or Y-direction sense lines through a bank of MOS transistor switches. As described elsewhere many many times, the two selected sense lines are those which are adjacent to the selected and excited drive line and are spaced apart from the drive line in both sides by a predetermined distance. The two selected sense lines therefore form a loop as described elsewhere. When the input pen 7 is present adjacent to or in the loop defined by these sense lines, the magnetic fluxes are induced by the drive current flowing through the drive line selected by the drive circuit 4 and the flux density is enhanced by the ferrite or magnetic body 7b of the input pen 7. As a result, the voltage is induced across the terminals of the two selected sense lines as described hereinbefore. And the induced voltage is amplified. When the amplified voltage exceeds a predetermined threshold value, the sense circuit 5 outputs the detect strobe signal 117.

The pulse generator 9 is so constructed and arranged that the clock pulses 110 at for instance 4 MHz may be derived in a stable and reliable manner. The counter 10 counts the clock pulses 110 from the pulse generator 9. The least significant bit of the five bits counted by the counter 10 is designated by the first bit $b_0$, the next least significant bit, by the second bit $b_1$, and so on. Thus the most significant bit is $b_4$. The contents consisting of three bits, $b_1$, $b_2$ and $b_3$ represents the address of 8 X- or Y-direction drive lines on the pad 8. When the bit $b_0$ is at a low level, the region or address between the selected drive line and the sense line on the left of the selected drive line is designated, but when the bit $b_0$ is at a high level, the region or address between the selected drive line and the sense line on the right of the selected drive line is designated. The bit $b_4$ at a low level represents the scanning in the X-direction or axis while the bit $b_4$ at a high level, the scanning in the Y-direction.

The address selection code consisting of four bits $b_1$, $b_2$, $b_3$ and $b_4$ is applied to the decoder 11 so that it may be converted into a 16-lines address selection signal 114. The address selection signal is applied to the drive and sense circuits 4 and 5 as described above. When the bit $b_4$ is at a low level, 8 of 16-lines of the address selection signal 114 are at a high level and are used for selecting the X-direction drive and sense lines. On the other hand, when the bit $b_4$ is at a high level, 8 out of the 16-lines become a high level and are used for selecting the Y-axis drive and sense lines.

The bit $b_4$ or the signal 112 of the counter 10 is transmitted to the delay line 13 through the inverter 12. The delay circuit 13 delays the signal for a predetermined time interval required for passing the drive current through the selected drive line a predetermined time after this drive line has been selected by the drive circuit 4 and the sense lines have been also selected by the sense circuit 5. In the 8-th embodiment, the signal is delayed by a quarter of a cycle of the signal. The output or the drive current control signal 116 from the delay circuit 9 is transmitted to the drive circuit 4.

When the sense circuit 5 detects the position of the input pen 7 in the manner described above, the output or the detect strobe signal 117 rises to a high level.

When the drive and sense circuits 4 and 5 are scanning the pad 8 in the X-direction, the bit $b_4$ or the signal 113 from the counter 10 is at a low level, but in case of the scanning in the Y-direction, the signal 113 is at a high level. Therefore the output from the inverter 14 is at a high level in case of the scanning in the X-direction but is at a low level in case of the scanning in the Y-direction.

Therefore when the detect strobe signal 117 rises to a high level in case of the X-direction scanning, the output or the X-direction detect strobe signal 118 from AND gate 15 rises to a high level. In this case, the four bits $b_0$, $b_1$, $b_2$ and $b_3$ in the counter 10 are transferred into the X-direction data register 17 as the 4 bit detected data signal 120.

In like manner when the X coordinate is detected, the output or the Y-direction detect strobe signal 119 from the AND gate 16 rises to a high level. In this case, four bits $b_0$ through $b_3$ in the counter 10 are transferred into the Y-direction data register 18 as the 4-bit detected data signal 120.

It is to be understood that the discrimination between the X- and Y-direction data is not necessary. That is, when the detect strobe signal 117 rises to a high level, all of the five bits from $b_0$ to $b_4$ in the counter 10 may be transferred into a data storage register. And when an electronic computer external to the manipulation pad reads the contents in the data storage register, the discrimination between the X- and Y-axes may be made in response to the contents in the most significant digit or bit $b_4$ in the counter 10.

Figure 12:
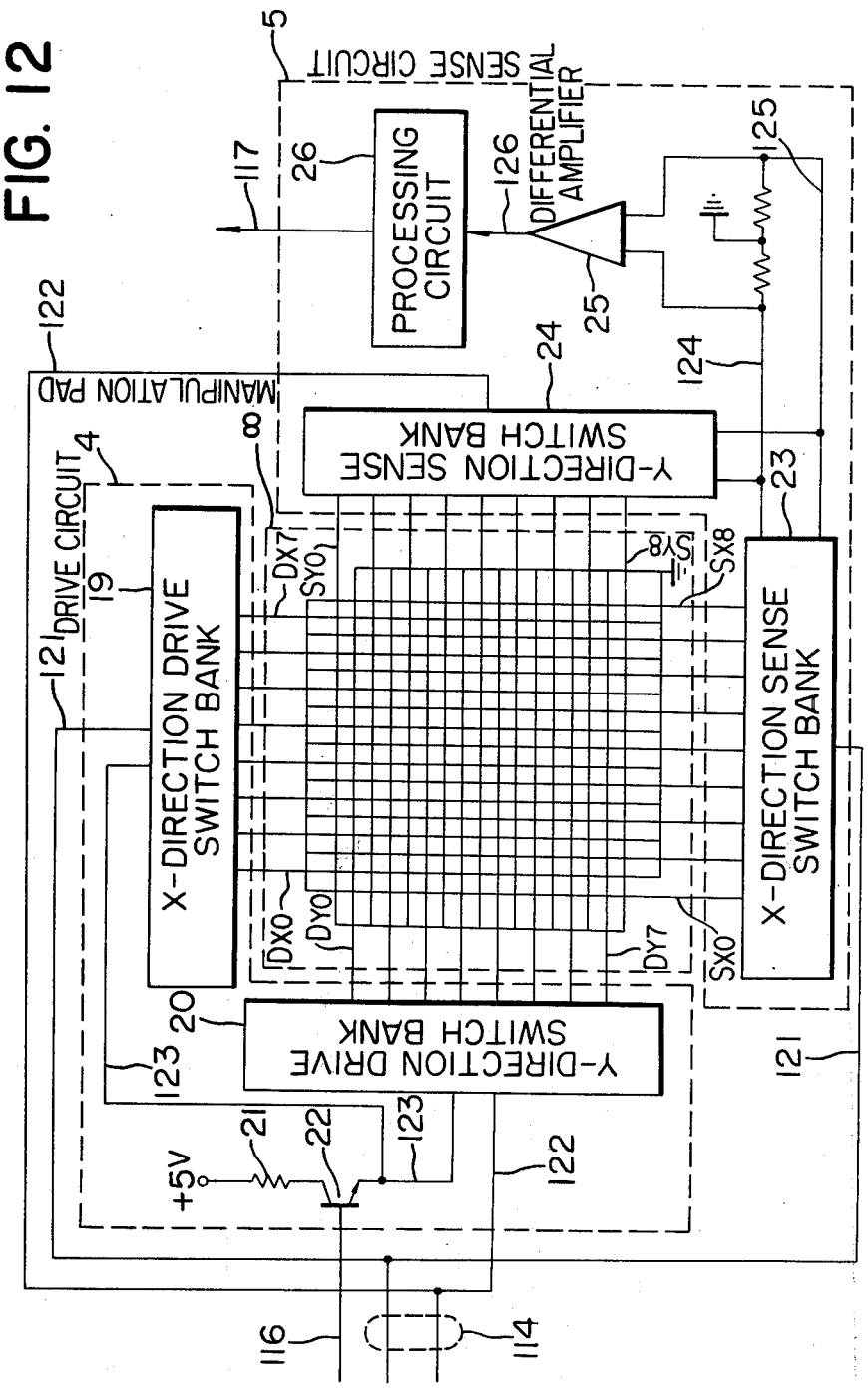
FIG. 12 is a detailed circuit diagram of the eighth embodiment.

In FIG. 12 there is shown a manipulation pad based on the second embodiment of the present invention. Especially the drive and sense circuits 4 and 5 are shown in detail. The X-direction drive lines $D_{X0}$ through $D_{X7}$, Y-direction drive lines $D_{Y0}$ through $D_{Y7}$, X-direction sense lines $S_{X0}$ through $S_{X8}$ and Y-direction sense lines $S_{Y0}$ through $S_{Y8}$ are arrayed in the form of a matrix as shown. The drive circuit 4 includes X- and Y-direction drive switch banks 19 and 20, a drive current load resistor 21, and drive current control switch 22. The sense circuit 5 includes X- and Y-direction sense switch banks 23 and 24, a differential amplifier 25 and a processing circuit 26.

121 and 122 are X and Y address selection signals; 123, a drive current supply line; 124 and 125, induced voltage output lines; and 126, an output signal from the differential amplifier 25.

The eight X-direction drive lines $D_{X0}$ through $D_{X7}$ are arrayed in parallel with each other and are spaced apart from each other by a predetermined same distance. One ends of the X-direction drive lines $D_X$ are connected to the X-direction drive switch bank 19 while the other ends thereof are grounded in common. In like manner, 8 Y-direction drive lines $D_Y$ are arrayed in parallel with each other and are spaced apart from each other by the same distance. One ends of the Y-direction drive lines $D_Y$ are connected to the Y-direction drive switch bank 20 while the other ends thereof are grounded in common. The X- and Y-direction drive lines $D_X$ and $D_Y$ are perpendicular to each other.

The address selection signal 114 consists of 16-lines, and 8-lines which sequentially rise to a high level in case of the X-direction scanning are transmitted as the X address selection signal 121 to the X-direction drive and sense switch banks 19 and 23. The remaining eight-lines which rise sequentially to a high level in case of the Y-direction scanning are transmitted as the Y-address selection signal 122 to the Y-direction drive and sense switch banks 20 and 24.

In response to the address selection signal the X-direction drive switch bank 19 sequentially connects the X-direction drive lines $D_{X0}$ through $D_{X7}$ one at a time to the drive current supply line 123 through a diode switch. The drive current control switch 22 supplies the drive current through the drive current supply line 123 to the X-direction drive lines $D_X$ which is connected by the X-direction drive switch bank 19. The time interval T during which the drive current is supplied is a time interval when the drive current control signal 116 is at a high level. (As will be described in detail below, the two sense lines corresponding to this selected and excited drive line $D_X$ are connected through the X-direction sense switch bank 23 to the induced voltage output lines 124 and 125.) After having been delayed by the delay circuit 13 in FIG. 11 by (T/4) the drive current control switch 22 is enabled so as to pass the rectangular waveform drive current for T/2, but the switch 22 is disabled during the remaining time interval T/4 so that no drive current flows.

It is preferable that the feedback to a current source of the drive current due to the grounding of the drive lines D may not adversely adffect the magnetic flux distribution on the face of the manipulation pad 8. To this end, a copper plate may be disposed in opposed relation with the working board of the pad 8 and spaced apart therefrom by a suitable distance so that the drive current may be fed back to the current source through this copper plate.

Figure 14:
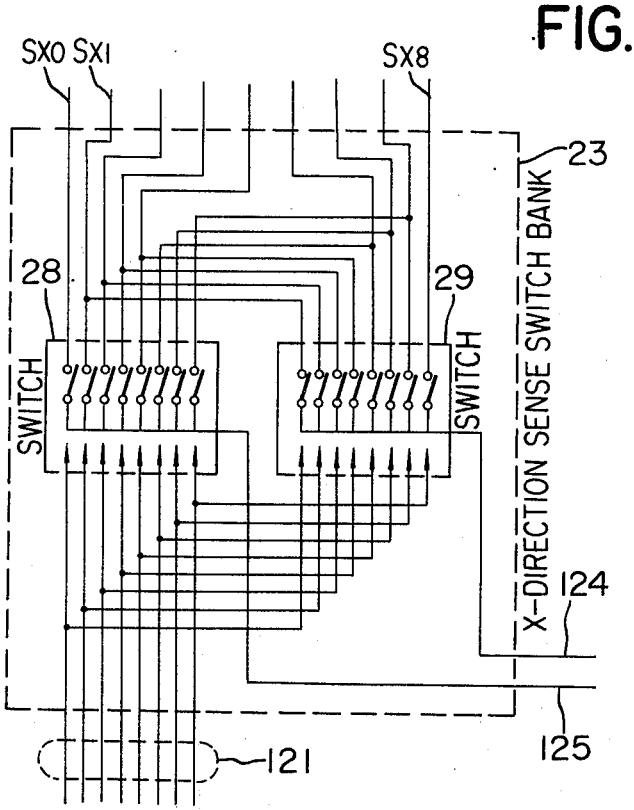
FIG. 14 shows a X-direction sense switch bank.

The X-direction drive switch bank 19 will be described in detail below with reference to FIG. 14. The Y-direction drive switch bank 20 is substantially similar in construction and mode of operation to the X-direction drive switch bank 19.

Nine X-direction sense lines $S_{X0}$ through $S_{X8}$ are arrayed in parallel with each other and spaced apart from each other by the same distance. The sense lines $S_{X1}$ is extended between the drive lines $D_{X0}$ and $D_{X1}$; the sense lines $S_{X2}$ is extended between the drive lines $D_{X1}$ and $D_{X2}$; and so on. One ends of the X-direction sense lines $S_X$ are connected to the X-direction sense switch bank 21 while the other ends are grounded in common. Nine Y-direction sense lines $S_{Y0}$ through $S_{Y8}$ are arrayed in a manner substantially similar to that described above, and one ends of the Y-direction sense lines $S_Y$ are connected to the Y-direction sense switch bank 22 while the other ends are connected together. In response to the address selection signal the X-direction sense switch bank 23 selects two sense lines $S_{Xn}$ and $S_{X(n+1)}$ adjacent to the selected and excited drive line $D_{Xn}$ on either sides thereof and connects them to the induced voltage output lines 124 and 125, respectively. For instance, when the drive line $D_{X0}$ is selected and excited, the voltage induced across the sense line $S_{X0}$ is drived from the output line 125 while the voltage induced across the sense line $S_{X1}$ is derived from the output line 124. As described hereinbefore, the selected two sense lines $S_{X0}$ and $S_{X1}$ form a loop around the selected and excited drive lines $D_{X0}$. The neutral point of the output lines 124 and 125 are grounded. The induced voltages are amplified by the differential amplifier 25 and the output 126 of the amplifier 25 is applied to the processing circuit 26.

Figure 13:
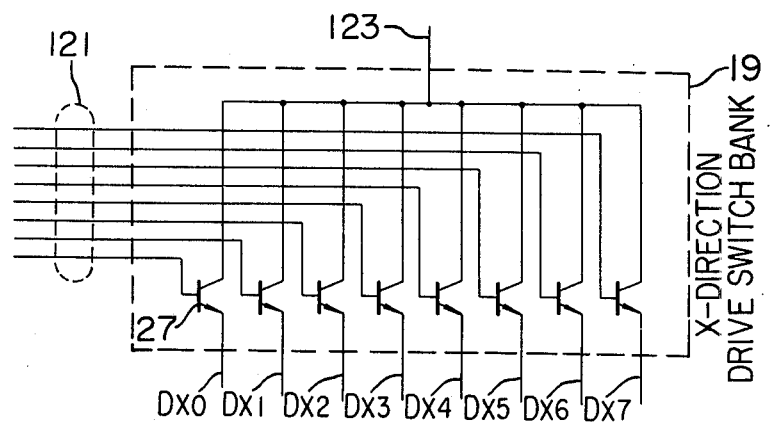
FIG. 13 shows a X-direction drive switch bank.

FIG. 13 shows an example of the X-direction drive switch bank 19 consisting of switches 27 which are diodes. FIG. 14 shows the construction of the X-direction sense switch bank 23 consisting of switches 28 and 29 which are MOS transistors. The Y-direction drive switch bank and the Y-direction sense switch bank are substantially similar in construction to the X-direction drive and sense switch banks.

Figure 15:
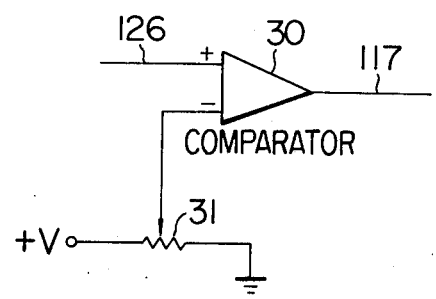
FIG. 15 is a diagram of a processing circuit.

In FIG. 15 there is shown the processing circuit 26 consisting of a threshold detect circuit or a comparator 30 and a variable resistor 31. When the output signal 126 from the amplifier 25 exceeds a threshold value which is set by the variable resistor 31, the comparator 30 outputs the strobe signal 117.

Figure 16:
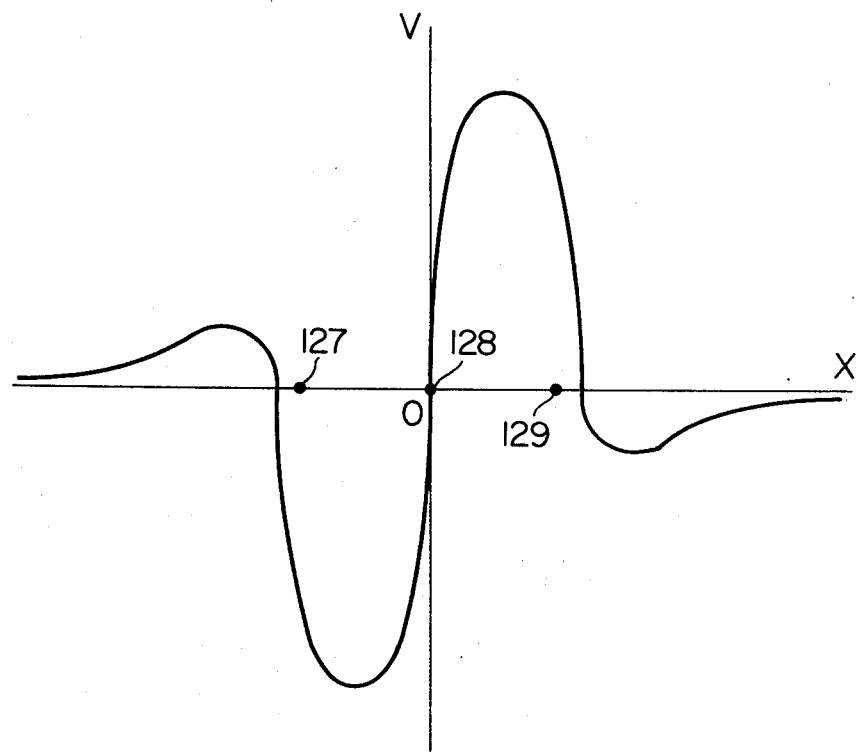
FIG. 16 is a graph showing the relation between the position of the tip of the input pen and the induced voltage, the graph being used for the explanation of the mode of operation of the processing circuit shown in FIG. 15.

FIG. 16 shows the relationship between the voltage induced across the sense line S and the distance between the drive line D and the tip of the input pen 7. The drive line and the sense lines are positioned at 127, 128 and 129, respectively, and the input pen 7 is made into contact with the pad face. The drive current is sinusoidal and has a constant frequency. It can be seen that the polarity of the induced voltage changes at the drive line (X=0) and at points slightly spaced apart from the sense lines 127 and 129.

Figure 17:
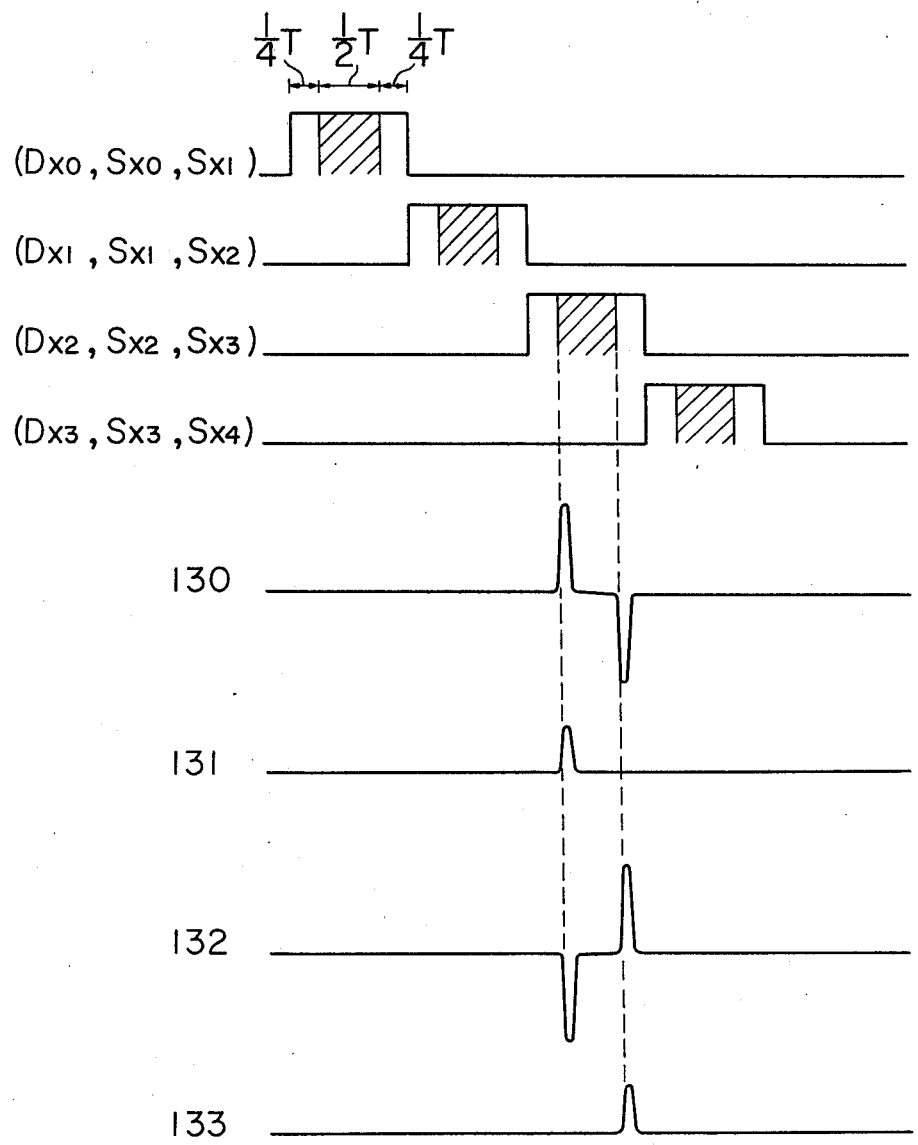
FIG. 17 shows waveforms used for the explanation of the mode of operation of the eighth embodiment.

Referring to FIG. 17, ($D_{X0}$, $S_{X0}$, $S_{X1}$) shows that the drive line $D_{X0}$ is selected and excited while the sense lines $S_{X0}$ and $S_{X1}$ are simultaneously selected. The hatched area shows a waveform of the drive current. When the tip of the input pen 7 is made into contact with the region or address between the drive line $D_{X2}$ and the sense line $S_{X2}$, the positive-going pulse voltage 130 appears at the rising edge of the drive current pulse and the negative-going induced voltage pulse appears at the falling edge of the drive current pulse. When the positive-going pulse is higher than a predetermined level set by the variable resistor 31 (See FIG. 15), the comparator 30 outputs a strobe pulse 131. In this case, the contents in the counter 10 is $(b_4, b_3, b_2, b_1, b_0) = (0\ 0\ 1\ 0\ 0)$ This means that the X-direction address "4" is detected. When the input pen 7 is made into contact with the region or address between the drive line $D_{X2}$ and the sense line $S_{X3}$, the negative-going pulse appears at the rising edge of the drive current pulse as shown at 132 in FIG. 17 while the positive-going pulse appears at the falling edge. Therefore the comparator 30 outputs a strobe pulse 133. In this case the contents in the counter 10 is (0 0 1 0 1). This means that the X-direction address "5" is detected. The detection of the Y-direction address is substantially similar to that described above.

Figure 18:
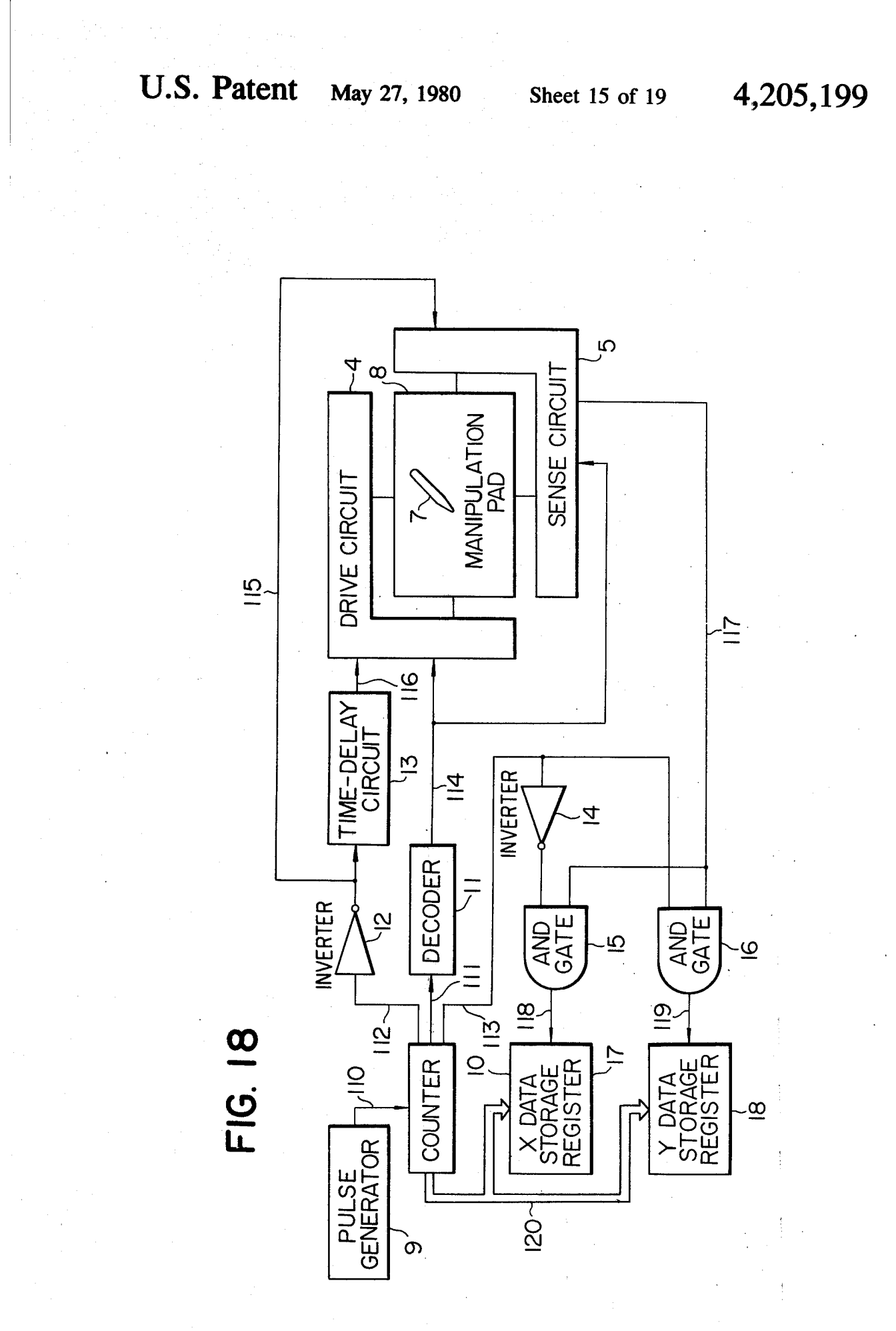
Figure 19:
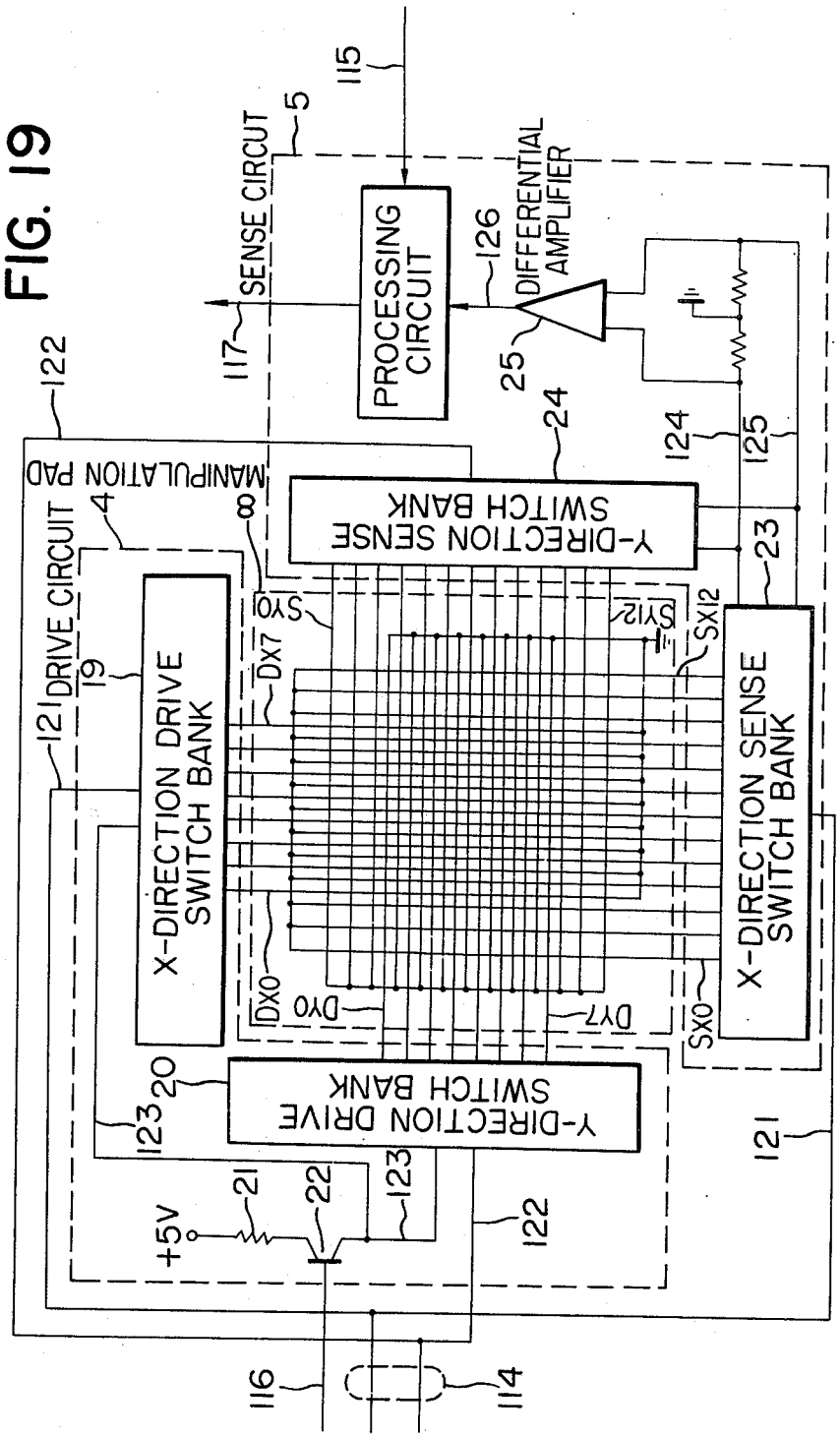
FIG. 19 is a detailed circuit diagram thereof.

Ninth Embodiment, FIGS. 18 and 19

In the embodiments described above, a large number of drive and sense lines are sequentially selected so that the drive and sense circuits must include a large number of drive or sense switches. In order to reduce the number of switches, in the ninth embodiment to be described with reference to FIGS. 18 and 19 an envelope of the induced voltage is obtained and a time when the polarity of the obtained envelope changes is detected as will be described in detail below.

Referring to FIGS. 18 and 19, the ninth embodiment of the present invention is substantially similar in construction to the eighth embodiment shown in FIG. 11 except that a sampling signal 115 is transmitted from the inverter 12 to the sense circuit 5.

The pulse generator 9 generates the clock pulses 110 at for instance 4 MHz, and the 8-bit counter 10 counts the clock pulses. The four bits $b_0$, $b_1$, $b_2$ and $b_3$ in the counter 10 are used to detect detail addresses dividing the drive lines on pad 8 into 16, and the three bits $b_4$, $b_5$ and $b_6$ are used to access 8 drive lines in the X or Y direction. When the bit $b_7$ is at a low level, the scanning is effected in the X direction, but when it is at a high level the scanning is effected in the Y-direction. The four bits $b_4$, $b_5$, $b_6$ and $b_7$ are applied to the decoder 11 as the address selection signal 111 so that the signal 111 may be converted into the 16-lines address selection signal 114. The address selection signal 114 is applied to both the drive and sense circuits 4 and 5. Eight lines which sequentially rise to a high level when the bit $b_7$ is at a low level are used to select the drive and sense lines in the X-direction. The 8 bits which sequentially rise to a high level when the bit $b_7$ is at a low level are used to select the drive and sense lines in the Y-direction. The fourth bit $b_3$ in the counter 10 is applied through the inverter 12 to the delay circuit 13. The delay circuit 13 delays the signal in such a way that the drive current may be passed through the selected drive line a predetermined time interval after the said drive line has been selected. Depending upon the delay time, the sense circuit 5 must select a time when the detect strobe signal is output so that the delay time must be accurate. As in the eight embodiment, the delay time in the ninth embodiment is a quarter of a cycle of the input signal. The output or the drive current control signal 116 is applied to the drive circuit 4.

The output from the inverter 12 is applied as the sampling signal 115 to the sense circuit 5 and is used for sampling the voltage induced across the sense line at the leading or rising edge of the square waveform drive current.

When the sense circuit 5 senses the position of the input pen 7, the detect strobe signal 117 rises to a high level. As described elsewhere, the 8-th bit $b_7$ in the counter 10 or the signal 113 is at a low or high level depending upon the scanning is made in the X- or Y-direction. Therefore in case of the scanning in the X-direction the output from the inverter 14 is at a high level. As a result, the output from AND gate 15; that is, the X-direction detect strobe signal 118 is at a high level when the X-direction address is detected. In this case, the seven bits from $b_0$ to $b_6$ in the counter 10 are transferred as the detected data signal 120 into the X-direction data storage register 17.

In like manner, when the Y-direction address is detected, the output or the Y-direction detect strobe signal 119 from the AND gate 16 rises to a high level. In this case, the contents from $b_0$ through $b_6$ in the counter 10 is transferred into the Y-direction data storage register 18 as the detected data signal 120.

It is to be understood that the discrimination between X- and Y-direction data is not required as described above. That is, when the detect strobe signal 117 rises to a high level, the contents from $b_0$ to $b_7$ in the counter 10 is transferred into a data storage register, and after an electronic computer has read this contents, whether the data read is for X- or Y-direction is determined by the state of the most significant bit $b_7$.

In FIG. 19, $D_{X0}$ through $D_{X7}$ are X-direction drive lines; $D_{Y0}$ through $D_{Y7}$, Y-direction drive lines; $S_{X0}$ through $S_{X12}$, X-direction sense lines; $S_{Y0}$ through $S_{Y12}$, Y-direction sense lines; 19, the X-direction drive switch bank; 20, the Y-direction sense switch bank; 21, the drive current load resistor; 22, the drive current control switch; 23, the X-direction sense switch bank; 24, the Y-direction sense switch bank; 25, the differential amplifier; 26, the processing circuit; 121, the X-address selection signal; 122, the Y-address selection signal; 123, the drive current supply line; 124 and 125, the induced voltage output lines; and 126, the output from the differential amplifier 25.

Eight X-direction drive lines $D_{X0}$ through $D_{X7}$ are extended in parallel and spaced apart from each other by the same distance. One ends of the drive lines $D_X$ are connected to the X-direction drive switch bank 19 while the other ends thereof are grounded. Eight Y-direction drive lines $D_{Y0}$ through $D_{Y7}$ are extended in parallel with each other and are equidistantly spaced apart from each other. One end of the Y-direction drive lines $D_Y$ are connected to the Y-direction drive switch bank 20 while the other ends thereof are grounded. The X-direction drive lines $D_X$ and the Y-direction drive lines $D_Y$ are perpendicular to each other.

The address selection signal 114 consists of 16-lines. Of these 16-lines, 8-lines which rise to a high level in case of the scanning in the X-direction are supplied as the X-address selection signal 121 to the X-direction drive switch bank 19 and the X-direction sense switch bank 23. The remaining 8-lines which rise to a high level in case of the scanning in the Y-direction are supplied as the Y-address selection signal 122 to the Y-direction drive switch bank 20 and the Y-direction sense switch bank 24.

The X-direction drive switch bank 19 responds to the 8-line X-address selection signal so as to connect one of the drive lines $D_{X0}$ through $D_{X7}$ to the drive current supply line 123 through a diode switch. The drive current control switch (diode switch) supplies the drive current, which is controlled by the drive current load resistor 21, to the X-direction drive switch bank through the drive current supply line 123 for a time interval when the drive current control signal 116 is at a high level. In the ninth embodiment, the time interval when the drive current supply one 123 is connected to one of the X-direction drive lines $D_X$ is designated by T. (The two sense lines $S_X$ corresponding to the selected and excited drive line $D_X$ are also selected by the X-direction sense switch bank 23 and connected to the output lines 124 and 125 as described hereinbefore and as will be described in detail again hereinafter). As described above, the time delay circuit 13 (see FIG. 18) delays the signal by T/4 so that the drive current control switch 22 is enabled after T/4 so that the rectangular waveform drive current flows for T/2. The switch 22 is disabled for the remaining time T/4 so that no drive current flows.

It is preferable that the feedback of the drive current to the current source by grounding the other ends of the drive lines $D_X$ will not adversely affect the magnetic flux distribution on the pad 8. To this end, a copper plate is placed on the opposite side of the working board of the pad 8 and spaced apart therefrom by a suitable distance so that all of the drive current may be fed back through this copper plate to the current source.

Thirteen X-direction sense lines $S_{X0}$ through $S_{X12}$ are extended in parallel with each other and equidistantly spaced apart from each other. The X-direction sense lines $S_X$ are in parallel with the X-direction drive lines $D_X$ and are spaced apart therefrom by the same distance. The sense line $S_{X3}$ is extended between in parallel with the drive lines $D_{X0}$ and $D_{X1}$, the sense line $S_{X4}$ is extended between and in parallel with the drive lines $D_{X1}$ and $D_{X2}$; and so on. One ends of the sense lines $S_X$ are connected to the X-direction sense switch bank 23 while the other ends thereof are connected together. Thirteen Y-direction sense lines $S_{Y0}$ through $S_{Y12}$ are extended in a manner substantially similar to that described above, and one ends are connected to the Y-direction sense switch bank 24 while the other ends are connected together.

In response to one of the 8-line X-address selection signals which becomes at a high level, the X-direction sense switch bank 23 connects two sense lines which are spaced apart from the selected and excited drive line $D_X$ to the left and right by a predetermined distance (a distance equal to 2.5 times the distance between the adjacent drive lines $D_X$ in the ninth embodiment) to the output lines 125 and 124, respectively. For instance, when the drive line $D_{X0}$ is selected and excited, the sense line $S_{X0}$ is connected to the output line 125 while the sense line $S_{X5}$ is connected to the output line 124.

The two selected sense lines $S_X$ form a loop because their the other ends are connected together, and one selected and excited drive line $D_X$ is extended between and in parallel with them. The neutral point of the output lines 124 and 125 are grounded.

The induced voltages are amplified by the differential amplifier 25, and the output or the amplifier output signal 126 from the amplifier 25 is applied to the processing circuit 26. In response to the sampling signal 115, the processing circuit 26 samples the induced voltage which appears at the leading edge of the rectangular drive current pulse. The sampled induced voltage is made to pass through a low-pass filter so that an envelope of the sampled induced voltage may be obtained. When the envelope thus obtained equals a predetermined threshold value, the detect strobe signal 117 is derived.

Figure 20:
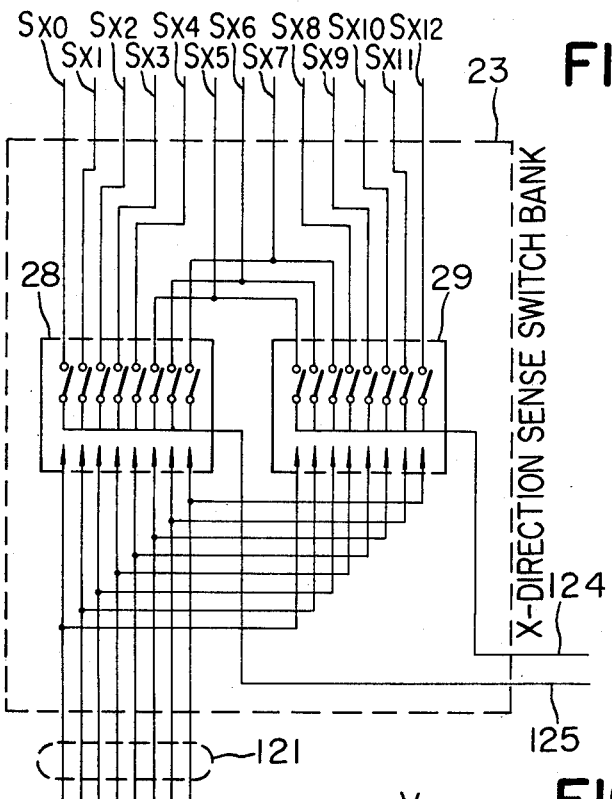
FIG. 20 shows a X-direction sense switch bank.

FIG. 20 shows the construction of the X-direction sense switch bank 20 consisting of switches 28 and 29 which are MOS transistor. The construction of the X-direction drive switch bank 19 is same as FIG. 13 in the eighth embodiment.

Figure 21:
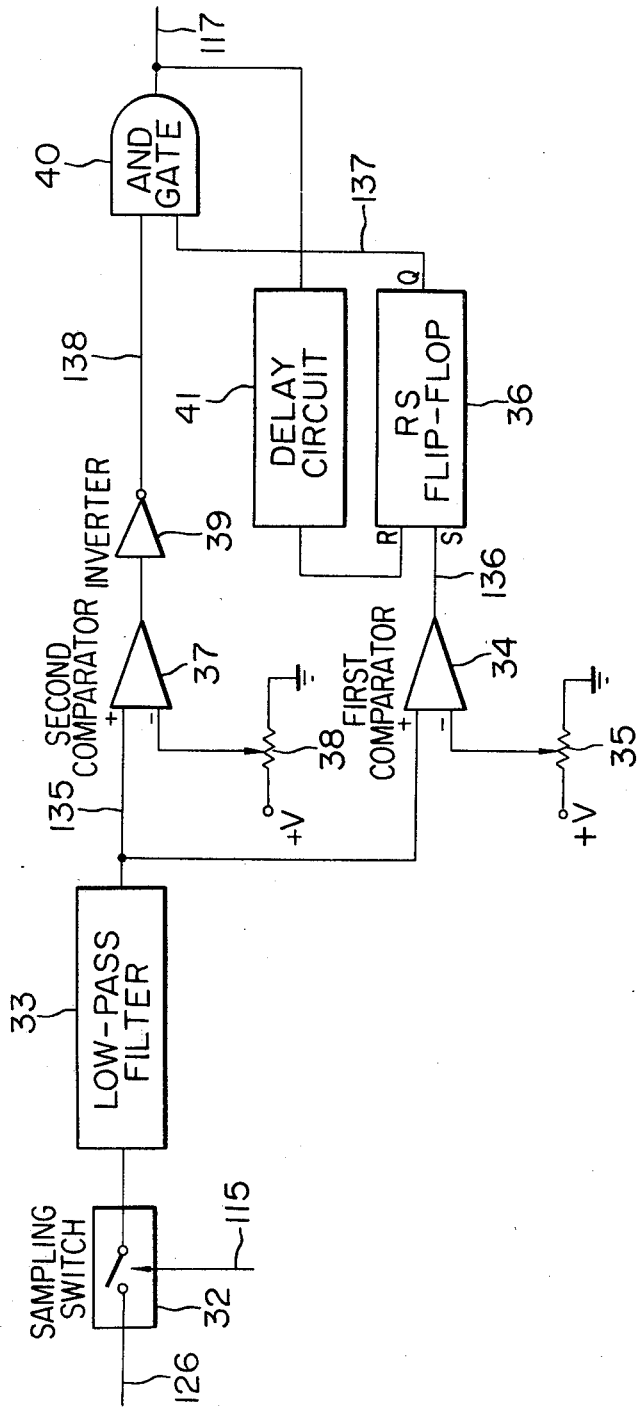
FIG. 21 is a block diagram of a processing circuit.

FIG. 21 shows an example of the processing circuit 26 in the ninth embodiment comprising a sampling switch (MOS switch 32), a low-pass filter 33, a first comparator 34, a variable resistor 35, a second comparator 37, a second variable resistor 38, an inverter 39, an AND gate 40, a delay circuit 41, and a RS flip-flop 36.

Figure 22:
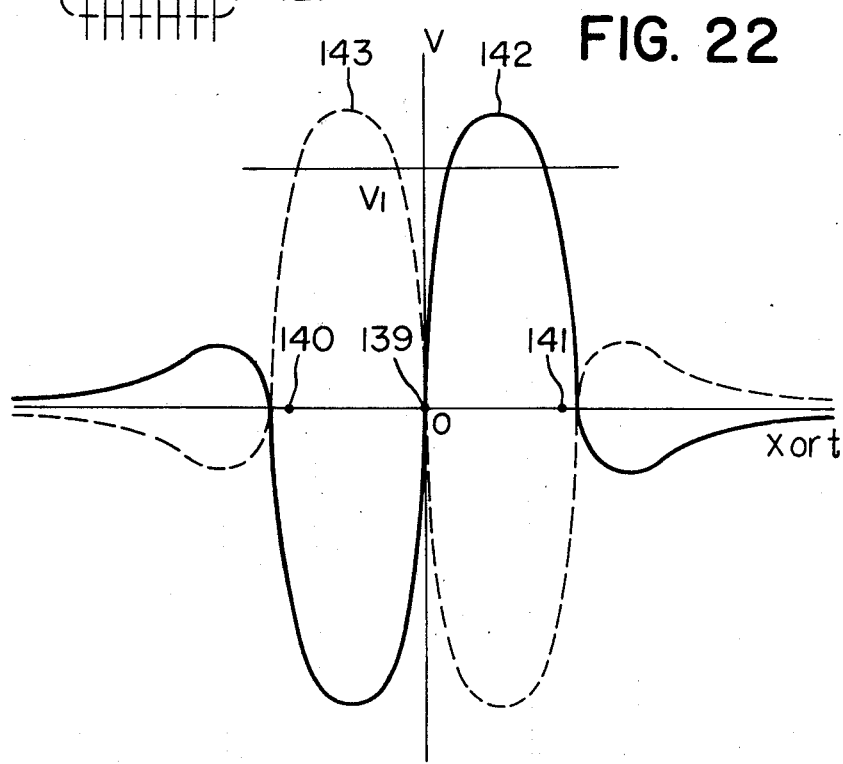
FIGS. 22 and 23 show waveforms used for the explanation of the mode of operation of the processing circuit shown in FIG. 21.

The mode of operation of the processing circuit with the above construction will be described with further reference to FIGS. 2 and 23. FIG. 22 shows the relation between the voltage induced across the sense line and the distance x between the drive line and the tip of the input pen 7. The drive line and the sense lines are located at 139, 140 and 141, respectively, and the tip of the input pen 7 is made into contact with the pad 8. The drive current is sinusoidal and has a constant frequency. It can be seen that the polarity of the induced voltage V reverses on the drive line (X=0) and at points slightly spaced part from the sense lines.

The most important feature of the present invention is the reversal of the polarity of the induced voltage on the drive line. The relation between the induced voltage V and a time t when the input pen 7 is kept stationary while the drive and sense lines are displaced at a constant velocity to the X-axis direction is indicated by the broken line curve 143. When the induced voltage V reaches a second threshold level or V=0 after passing a first threshold level $V_1$, the tip of the input pen is in line with the drive line. Therefore the distance from the initial position of the drive line to the position where the drive line is in line with the tip of the input pen 7 may be obtained by measuring a time interval from the time when the displacement is started to the time when the second threshold level is detected. According to the present invention, instead of mechanically displacing the drive and sense lines they are electrically scanned in one direction whereby the position of the input pen may be detected. Since the drive and sense lines are equidistantly spaced apart from each other and because the rectangular waveform drive current is used, the induced voltages become voltage pulses which occur at a predetermined time interval. As described above, the envelope of these voltage pulses is obtained by passing them through the low-pass filter. The envelope thus obtained is fundamentally equal to the waveform 143 in FIG. 22.

Figure 23:
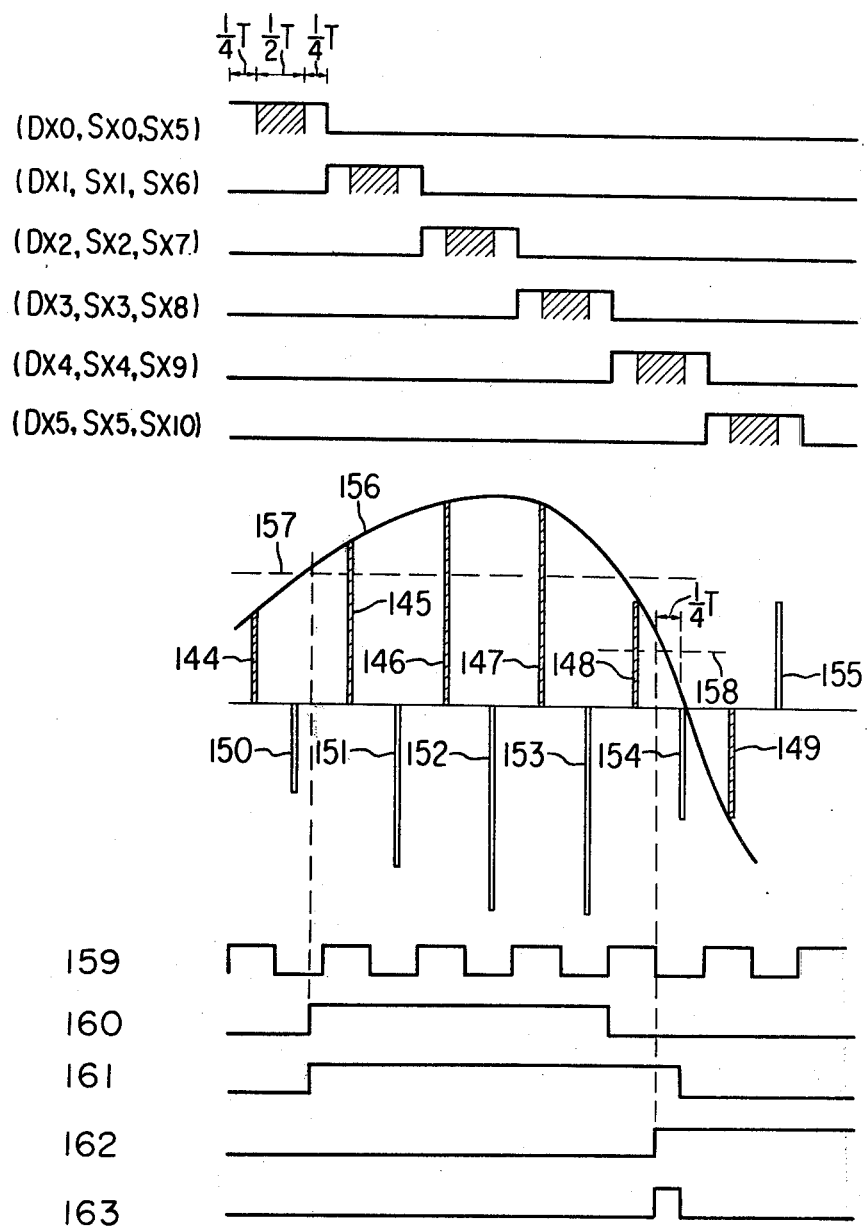

In FIG. 23 ($D_{X0}$, $S_{X0}$, $S_{X5}$) shows that the drive line $D_{X0}$ is selected and excited while the sense lines $S_{X0}$ and $S_{X5}$ are simultaneously selected. The hatched area shows the waveform of the drive current flowing through the selected and excited drive line $D_{X0}$. Same is true for ($D_{X1}$, $S_{X1}$, $S_{X6}$), . . . , and ($D_{X5}$, $S_{X5}$, $S_{X10}$).

It is assumed that the tip of the input pen 7 is made into contact with a point (with the X address 4.5) intermediate the drive lines $D_{X4}$ and $D_{X5}$. Then the output signals 126 are derived from the differential amplifier 25 as indicated by 144, 145, . . . , and 155 in FIG. 23. The pulses 144 through 149 are derived at the leading edge of the drive current while the pulses 150 through 155 are derived at the trailing edge of the drive current. With the sampling signal 115 (whose waveform is shown at 159 in FIG. 23) the sampling switch 32 (See FIG. 21) samples the voltage pulses 144 through 149 (the sampled signal 134 in FIG. 21), and these pulses are transmitted through the low-pass filter 33 so that the envelope signal 135 whose waveform is indicated by 156 in FIG. 23 may be obtained. When the envelope 156 exceeds the first threshold level (indicated by 157 in FIG. 23), the first comparator 34 outputs the first threshold level detect signal 136 as indicated by 160 in FIG. 23. The first threshold level detect signal 136 is applied to the set terminal of the flip-flop 36 so that the latter is set. As a result, as shown at 161 in FIG. 23, the output signal 137 form the flip-flop 36 rises to a high level.

When the envelope 156 drops below the second threshold level (indicated by 158 in FIG. 23) which is set by the variable resistor 38, the output signal from the second threshold level detecting circuit or the comparator 37 drops to a low level. The low level output signal from the second comparator 37 is inverted into the high level signal 138 by the inverter 39 as indicated by 167 in FIG. 23.

According to the present invention, the second threshold value is not set to zero because of the reason to be described below. As described above, the signal from the counter 10 (See FIG. 18) is delayed by T/4 by the delay circuit 13 so that the time when the drive current rises is delayed by the same time interval T/4. Therefore when the second threshold level is set to zero, the second threshold level detect signal 138 is also delayed by T/4. Therefore the second threshold level 158 in FIG. 23 must be so selected that the second threshold level detect signal 138 appears earlier by T/4. Alternatively, the second threshold level may be set to zero and the number of clock pulses which has been counted during the time interval T/4 may be subtracted from the contents in the counter 10.

When both the outputs 137 and 138 from the flip-flop 36 and the inverter 38 rise to a high level, the output or the detect strobe signal 117 from the AND gate 40 also rises to a high level as indicated by 163 in FIG. 23. After having been delay by a predetermined time (T/4 in this embodiment), the detect strobe signal 117 is applied to the reset terminal of the flip-flop 36 so that the latter is reset and consequently its output 137 drops to a low level. As a result the detect strobe signal 117 drops to a low level.

As described above, when the detect strobe signal 117 rises to a high level, the contents from $b_0$ through $b_6$ in the counter 10 is transferred into the X data storage register 17. The contents in the counter 10 is $$(b_6, b_5, \ldots, b_0) = (1\ 0\ 0\ 1\ 0\ 0\ 0)$$

This means that the X address 4.5 is detected. The detection of the Y address is effected in a manner substantially similar to that described above.

In the ninth embodiment the induced voltage pulses generated when the rectangular waveform drive current rises are sampled by the sampling switch 32 (See FIG. 21), but it is to be understood that those generated when the rectangular waveform drive current drops may be sampled. In this case, the second threshold level must be so selected that the detect strobe signal 117 may appear 3T/4 faster than the time when the polarity of the envelope is reversed.

What is claimed is:
1. A tablet input device comprising
   (a) a manipulation pad consisting of
      a drive line group consisting of a plurality of parallel conductors, and
      a sense line group consisting of a plurality of parallel conductors,
      said groups being parallel to each other and mutually interlaced;
   (b) a drive circuit connected to said drive line group for selecting sequentially one or more drive lines and passing a variable drive current through said selected drive line or drive lines;
   (c) a sense circuit connected to said sense line group for selecting one or more sense lines at the positions corresponding to said one or more selected drive lines and detecting the voltage induced across said one or more selected sense lines, at least two lines of one group and one line of the other group disposed therebetween being simultaneously selected; and
   (d) an input pen for coupling together adjacent drive and sense lines at any selected point on said manipulation pad;
   whereby when said variable drive current flows through said one or more selected drive lines adjacent to the point indicated by said input pen, said sense circuit may detect voltage induced across said one or more selected sense lines, thereby detecting the point selected by said input pen.

2. A tablet input device as set forth in claim 1 wherein said sense circuit detects the magnitude of the voltage induced across said one or more selected sense lines.

3. A tablet input device as set forth in claim 1 wherein said sense circuit detects the polarity of the voltage induced across said one or more selected sense lines.

4. A tablet input device as set forth in claim 1 wherein said input pen includes a magnetic body.

5. A tablet input device as set forth in claim 1 wherein said input pen includes an electrical conductor.

6. A tablet input device as set forth in claim 1 wherein one ends of both said drive lines are connected together and one ends of said sense lines are connected together.

7. A tablet input device as set forth in claim 1 wherein one ends of said drive lines are connected together so as to be fed back to said drive circuit; and one ends of said sense lines are connected together.

8. A tablet input device as set forth in claim 1 wherein one ends of said drive lines are connected together; and one ends of said sense lines are connected together so as to be fed back to said sense circuit.

9. A tablet input device as set forth in claim 1 wherein one ends of said drive lines are connected together so as to be fed back to said drive circuit; and one ends of said sense lines are connected together so as to be fed back to said sense circuit.

10. A tablet input device as set forth in claim 1 wherein one ends of both said drive and sense lines are connected together so as to be fed back to said drive and sense circuits.

11. A tablet input device as set forth in claim 1 wherein said drive and sense lines each are arrayed in the form of a loop; and said looped drive and sense lines are interlaced.

12. A tablet input device as set forth in claim 1 wherein said manipulation pad further includes as second group of drive lines which are parallel to each other but perpendicular to the drive lines of said first mentioned drive line group; and a second group of sense lines which are in parallel with each other but are perpendicular to the sense lines of said first mentioned sense line group.

13. A tablet input device characterized by the provision of
   (a) a manipulation pad including a group of parallel drive lines which are conductors, and a group of parallel sense lines which are conductors and which are arrayed in parallel and coplanar relationship with said parallel drive lines;

(b) an input pen for indicating a point on the face of said manipulation pad, said input pen holding a magnetic or electrically conductive body at the tip thereof;

(c) a counter consisting of a first counter means for counting the address data associated with said drive or sense lines and a second counter means for counting a fraction of the contents in said first counter means;

(d) a drive circuit connected to said group of drive lines for sequentially selecting one or more drive lines at a predetermined time interval and passing a variable drive current through said one or more selected drive lines; and (e) a sense circuit connected to said group of sense lines and responsive to the contents in said first counter means for selecting one or more sense lines at a predetermined time interval which are associated with said one or more selected drive lines, obtaining an envelope of the voltage which is induced across said one or more selected sense lines and which changes in time and deriving the contents in said counter as the address of the point indicated by said input pen when said envelope equals a predetermined threshold level.

14. A tablet input device as set forth in clam 13 wherein a first group of drive lines and a first group of sense lines are arrayed in row while a second group of drive lines and a second group of sense lines are arrayed in column; and said first and second groups of drive lines are connected to said drive circuit while said first and second groups of sense lines are connected to said sense circuit, whereby the point indicated by said input pen in the direction of rows may be detected by said first groups of drive and sense lines while said point in the direction of columns may be detected by said second groups of drive and sense lines.

15. A tablet input device characterized by the provision of (a) a manipulation pad having
a group of drive lines which are conductors and which are arrayed in parallel with each other and equidistantly spaced apart from each other and whose one ends are connected together so as to be fed back to said drive circuit; and
a group of sense lines which are conductors and whose one ends are connected together and which are arrayed in parallel with each other and in parallel and coplanar relationship with said drive lines and which are so interlaced with said drive lines that two sense lines may be located on either sides of any of said drive lines and equiangularly spaced apart therefrom;

(b) an input pen which is used for indicating a point on the face of said manipulation pad and which holds a magnetic body or an electrically conductive body at the tip thereof;

(c) a counter consisting of a first counter means for counting the address data associated with said drive lines and a second counter means for counting a fraction of the contents in said first counter means;

(d) a drive circuit which is connected to the other ends of said drive lines and which is responsive to the contents in said first counter means for sequentially selecting said drive lines one at a time and at a predetermined time interval and passing a rectangular waveform drive current through said selected drive line; and (e) a sense circuit which is connected to the other ends of said sense lines and which is responsive to the contents in said first counter means for sequentially selecting at a predetermined time interval two sense lines which are equidistantly spaced apart from said selected drive line on either sides thereof, sampling the voltages induced across the terminals of said two selected sense lines at the leading edge or the trailing edge of said rectangular waveform drive circuit, obtaining an envelope of said sampled induced voltages which change in time and deriving the contents in said counter as the address of the point indicated by said input pen when said envelope becomes equal to a second threshold level after said envelope has reaches a first threshold level.

16. A tablet input device as set forth in claim 15 wherein a first group of drive lines and a first group of sense lines are arrayed in row while a second group of drive lines and a second group of sense lines are arrayed in column; and said first and second groups of drive lines are connected to said drive circuit while said first and second groups of sense lines are connected to said sense circuit, whereby the point indicated by said input pen in the direction of rows may be detected by said first groups of drive and sense lines while said point in the direction of columns may be detected by said second groups of drive and sense lines.

* * * * *

UNITED STATES PATENT OFFICE
CERTIFICATE OF CORRECTION

Patent No. 4,205,199　　　　　　　Dated May 27, 1980

Inventor(s) Tamotsu Mochizuki

It is certified that error appears in the above-identified patent and that said Letters Patent are hereby corrected as shown below:

Column 6, line 48:　"a" should be --s--.

Column 13, line 57:　"inpat" should be --input--.

Column 19, line 31:　"clam" should be --claim--.

Signed and Sealed this

Fourth Day of November 1980

[SEAL]

Attest:

SIDNEY A. DIAMOND

Attesting Officer　　　Commissioner of Patents and Trademarks